(12) United States Patent
Hammad et al.

(10) Patent No.: US 11,488,125 B2
(45) Date of Patent: Nov. 1, 2022

(54) AUTOMOBILE MOBILE-INTERACTION PLATFORM APPARATUSES, METHODS AND SYSTEMS

(71) Applicant: VISA INTERNATIONAL SERVICE ASSOCIATION, San Francisco, CA (US)

(72) Inventors: Ayman Hammad, Pleasanton, CA (US); Julian Hua, Moraga, CA (US); Robert Rutherford, New York, NY (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 120 days.

(21) Appl. No.: 16/406,475

(22) Filed: May 8, 2019

(65) Prior Publication Data
US 2019/0266582 A1 Aug. 29, 2019

Related U.S. Application Data

(63) Continuation of application No. 14/503,921, filed on Oct. 1, 2014, now Pat. No. 10,325,248.
(Continued)

(51) Int. Cl.
*G06Q 30/00* (2012.01)
*G06Q 20/14* (2012.01)
(Continued)

(52) U.S. Cl.
CPC .......... *G06Q 20/14* (2013.01); *G06Q 20/102* (2013.01); *G06Q 20/227* (2013.01); *G06Q 20/36* (2013.01);
(Continued)

(58) Field of Classification Search
CPC .................................................. G06Q 30/00
See application file for complete search history.

(56) References Cited

U.S. PATENT DOCUMENTS 8,577,804 B1 * 11/2013 Bacastow ............ G06Q 20/102
705/44
8,583,494 B2 * 11/2013 Fisher ................ G06Q 20/3223
705/16

(Continued)

OTHER PUBLICATIONS

Erikson, Kevin, "The mobile wallet: What it does and why it matters", Credera, dated Mar. 1, 2013. (Year: 2013).*
(Continued)

*Primary Examiner* — Mark A Fadok
(74) *Attorney, Agent, or Firm* — Loeb & Loeb LLP

(57) ABSTRACT

The AUTOMOBILE MOBILE-INTERACTION PLATFORM APPARATUSES, METHODS AND SYSTEMS ("AMIP") The AMIP transforms cloud-based wallet and automobile settings into transaction and automobile outputs. In some embodiments, a user may request to connect an electronic wallet account to an automobile interface. Once the user's credentials have been authenticated, the automobile interface may request and receive from a remote server automobile-related and payment-method-related settings. The automobile interface may then configure its settings according to the received information.

18 Claims, 25 Drawing Sheets

Related U.S. Application Data

(60) Provisional application No. 61/885,367, filed on Oct. 1, 2013.

(51) Int. Cl.
  *G06Q 30/06* (2012.01)
  *G06Q 20/22* (2012.01)
  *G06Q 20/36* (2012.01)
  *G06Q 20/10* (2012.01)

(52) U.S. Cl.
  CPC ..... *G06Q 30/0633* (2013.01); *G06Q 30/0641* (2013.01)

(56) References Cited

U.S. PATENT DOCUMENTS

| | | | |
|---|---|---|---|
| 9,104,537 B1 | 8/2015 | Penilla | |
| 9,123,035 B2 | 9/2015 | Penilla | |
| 9,189,783 B2 | 11/2015 | Chowdhury | |
| 9,229,905 B1 | 1/2016 | Penilla | |
| 9,285,944 B1 | 3/2016 | Penilla | |
| 9,346,365 B1 | 5/2016 | Penilla | |
| 9,355,391 B2* | 5/2016 | von Behren | G06Q 20/105 |
| 10,325,248 B2 | 6/2019 | Hammad | |
| 2002/0077993 A1* | 6/2002 | Immonen | G06Q 20/04 |
| | | | 705/77 |
| 2006/0287783 A1 | 12/2006 | Walker | |
| 2007/0099683 A1 | 5/2007 | Panther Trice | |
| 2008/0126145 A1* | 5/2008 | Rackley, III | G06Q 20/102 |
| | | | 455/406 |
| 2010/0057624 A1* | 3/2010 | Hurt | G06Q 20/20 |
| | | | 705/76 |
| 2010/0280956 A1* | 11/2010 | Chutorash | G06Q 20/3278 |
| | | | 705/64 |
| 2012/0221200 A1 | 8/2012 | Golomb | |
| 2012/0290449 A1* | 11/2012 | Mullen | G06Q 20/322 |
| | | | 705/27.2 |
| 2012/0293323 A1 | 11/2012 | Kaib | |
| 2012/0310713 A1* | 12/2012 | Mercuri | G06Q 30/0201 |
| | | | 705/14.1 |
| 2013/0190967 A1 | 7/2013 | Hassib | |
| 2013/0191218 A1 | 7/2013 | Predescu | |
| 2013/0231999 A1 | 9/2013 | Emrich | |
| 2013/0233120 A1 | 9/2013 | Golomb | |
| 2013/0289819 A1 | 10/2013 | Hassib | |
| 2014/0020068 A1* | 1/2014 | Desai | G06Q 20/40 |
| | | | 726/4 |
| 2014/0022070 A1 | 1/2014 | Golomb | |
| 2014/0087760 A1 | 3/2014 | Bennett | |
| 2014/0129339 A1* | 5/2014 | MacNeille | G06Q 30/0207 |
| | | | 705/14.62 |
| 2014/0225724 A1 | 8/2014 | Rankin | |
| 2014/0240086 A1 | 8/2014 | Van Wiemeersch | |
| 2015/0095190 A1 | 4/2015 | Hammad | |
| 2015/0220916 A1* | 8/2015 | Prakash | G06Q 20/40 |
| | | | 705/41 |
| 2016/0173568 A1 | 6/2016 | Penilla | |
| 2016/0210670 A9 | 7/2016 | Bennett | |
| 2018/0130548 A1* | 5/2018 | Fisher | G16H 10/65 |

OTHER PUBLICATIONS

Webster, Larry, "The coming explosion of in-car infotainment apps", Popular Mechanics, dated: Jan. 27, 2011 (Year: 2011).*

Barry, Kieth, "The Future of In-Car Technology Your dashboard may soon become as versatile as your laptop, Car and Driver", Dated Apr. 8, 2010. <https://www.caranddriver.com/features/a15128721/the-future-of-in-car-technology/>(Year: 2010) (3 pages).

Corrected Notice of Allowability dated Mar. 13, 2019 for U.S. Appl. No. 14/503,921 (p. s1-2).

Notice of Allowance dated Jan. 28, 2019 for U.S. Appl. No. 14/503,921 (pp. 1-9).

Office Action dated May 3, 2018 for U.S. Appl. No. 14/503,921 (pp. 1-8).

Office Action dated Sep. 7, 2018 for U.S. Appl. No. 14/503,921 (pp. 1-8).

Vegni, Anna et al, Smart Vehicles, Technologies and Main Applications in Vehicular Ad hoc Networks; Intech open Science, Dated Feb. 13, 2013. (Year: 2013) (18 pages).

* cited by examiner

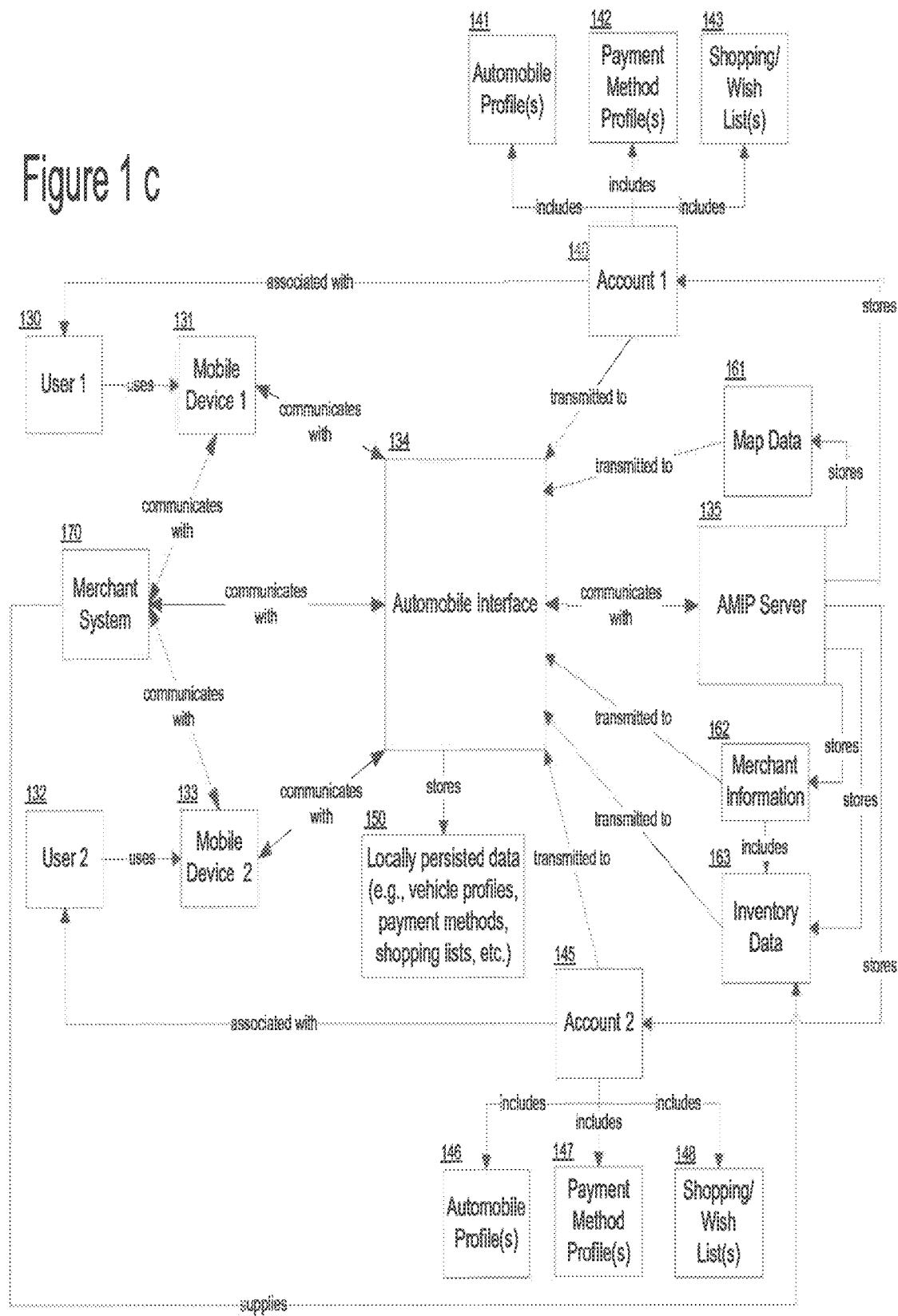

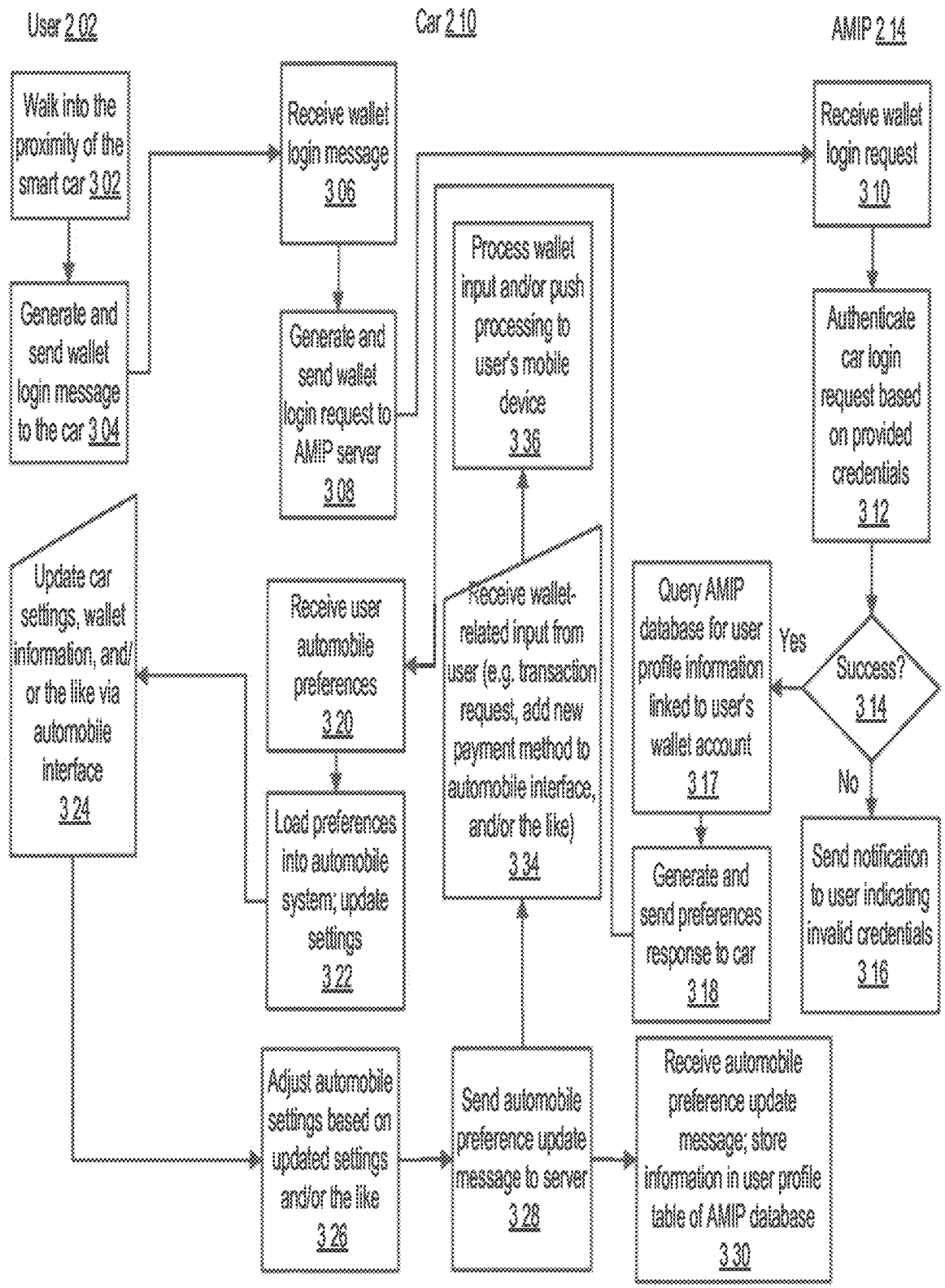
Figure 3a    Wallet Login, Settings Components

| Log Out | Jane |
|---|---|

| Range Mode 6.48 | OFF |
|---|---|
| Auto-Lock When Car Starts 6.50 | ON |
| Auto-Lock When Away From Car 6.52 | OFF |
| Child Protection Locks 6.54 | ON |
| Auto-Preset Handles 6.56 | ON |
| Turn Headlights Off After Exit 6.58 | ON |
| Remote Access for Mobile Apps 6.60 | ON |

| Log Out | Jane |
|---|---|

| Seat Position 6.62 | + 2"; upright |
|---|---|
| Seat Temperature 6.64 | 65°F |
| Suspension 6.66 | Eco |
| Engine 6.68 | Eco |
| Auto-Adjust Mirrors 6.70 | ON |

Figure 6c

| | Playlist | | | |
|---|---|---|---|---|
| Log Out | | | | |

Jane and Friend's Playlist    8.46    [Edit]

| Title | Artist | Album | Source | 8.48 |
|---|---|---|---|---|
| Thrift Shop | Macklemore & Ryan Lewis | The Heist | Jane's Wallet | |
| When I Was Your Man | Bruno Mars | Unorthodox Jukebox | Kendra's Wallet | |
| Stay | Rihanna | Unapologetic | Laura's Wallet | |
| Can't Hold Us | Macklemore & Ryan Lewis | The Heist | CD | |
| Suit & Tie | Justin Timberlake | The 20/20 Experience | Kendra's Wallet | |
| Mirrors | Justin Timberlake | The 20/20 Experience | Laura's Wallet | |

Add a Song

| Jane's Wallet | Kendra's Wallet | Laura's Wallet |
|---|---|---|
| "Thrift Shop" Macklemore & Ryan Lewis | "When I Was Your Man" Bruno Mars | "Mirrors" Justin Timberlake |
| "Just Give Me A Reason" Pink | "Suit & Tie" Justin Timberlake | "Stay" Rihanna |
| | "Heart Attack" Demi Lovato | "Feel This Moment" Pitbull Feat. Christina Aguilera |

AUTOMOBILE MOBILE-INTERACTION PLATFORM APPARATUSES, METHODS AND SYSTEMS

PRIORITY CLAIM

This application is a continuation of and claims priority to U.S. patent application Ser. No. 14/503,921, which was filed on Oct. 1, 2014, and is entitled "Automobile Mobile-Interaction Platform Apparatuses, Methods and Systems" which claims priority to U.S. provisional patent application Ser. No. 16/885,367, which was filed on Oct. 1, 2013 and entitled "Automobile Mobile-Interaction Platform Apparatuses, Methods and Systems," of which the entire application, including any and all drawings, is incorporated herein by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address interactions between cloud-based user accounts, such as electronic wallets, and automobiles.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

For the most part, vehicles today operate as autonomous units separate from the digital information world around them. For example, there are a variety of instances where a vehicle's passengers may engage in financial transactions while in the vehicle, such as going through a toll booth. To allow for automatic payment of tolls, drivers may use RFID-enabled transmitters, such as E-ZPass. However, these RFID transmitters are tied to a user's account, which means that even if someone else drives the user's car through a toll booth, the user would be the one charged. Moreover, the toll charged cannot be apportioned to two or more of the passengers at the time of charging.

There are other examples of the inflexibility of vehicles. Some vehicles have on-board microprocessors and in-dash displays, such as LCD monitors. These types of vehicles may allow users to program certain personalizeable features and preferences, such as radio stations, temperature, seating position, and mirror position. However, these programmable settings are stored locally on the vehicle and not easily portable. Thus, when a person rents a rental car, he would have to manually adjust and configure all the settings as he has done for his own car.

BRIEF DESCRIPTION OF THE DRAWINGS

The accompanying appendices and/or drawings illustrate various non-limiting, example, innovative aspects in accordance with the present descriptions:

FIGS. 1a-c show block diagrams illustrating example embodiments of the Automobile Mobile-Interaction Platform (AMIP);

FIGS. 3a-b show logic flow diagrams illustrating connecting an electronic wallet to an automobile interface in some embodiments of the AMIP;

FIGS. 6a-c show block diagrams illustrating some embodiments of the AMIP;

FIGS. 8a-c show block diagrams illustrating example media embodiments of the AMIP;

FIGS. 9a-b show block diagrams illustrating example wallet embodiments of the AMIP;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Figure 1A:

FIG. 1a shows a block diagram illustrating example embodiments of the Automobile Mobile-Interaction Platform (hereinafter referred to as "AMIP"). In some implementations, a user 101 may wish to connect her electronic wallet and/or electronic wallet-enabled device with her smart automobile 102. In some implementations, a smart automobile may be any vehicle (e.g. a car, motorcycle, truck, motor scooter, and/or the like) equipped with a display device and able to connect with an electronic wallet account. The user may wish to save automobile settings to her wallet account, utilize her wallet account for transactions in the smart automobile interface, and/or the like. The user may also wish to have the ability to connect multiple electronic wallet accounts to the automobile interface at once, may wish to generate a plurality of automobile settings profiles, and/or the like. AMIP may allow the user to connect her wallet account to the smart automobile's internal display interface, allow the user to save a plurality of automobile settings to her wallet account, allow the user to use her wallet account to perform financial transactions and to provide information to the automobile, and/or like actions.

Figure 1B:
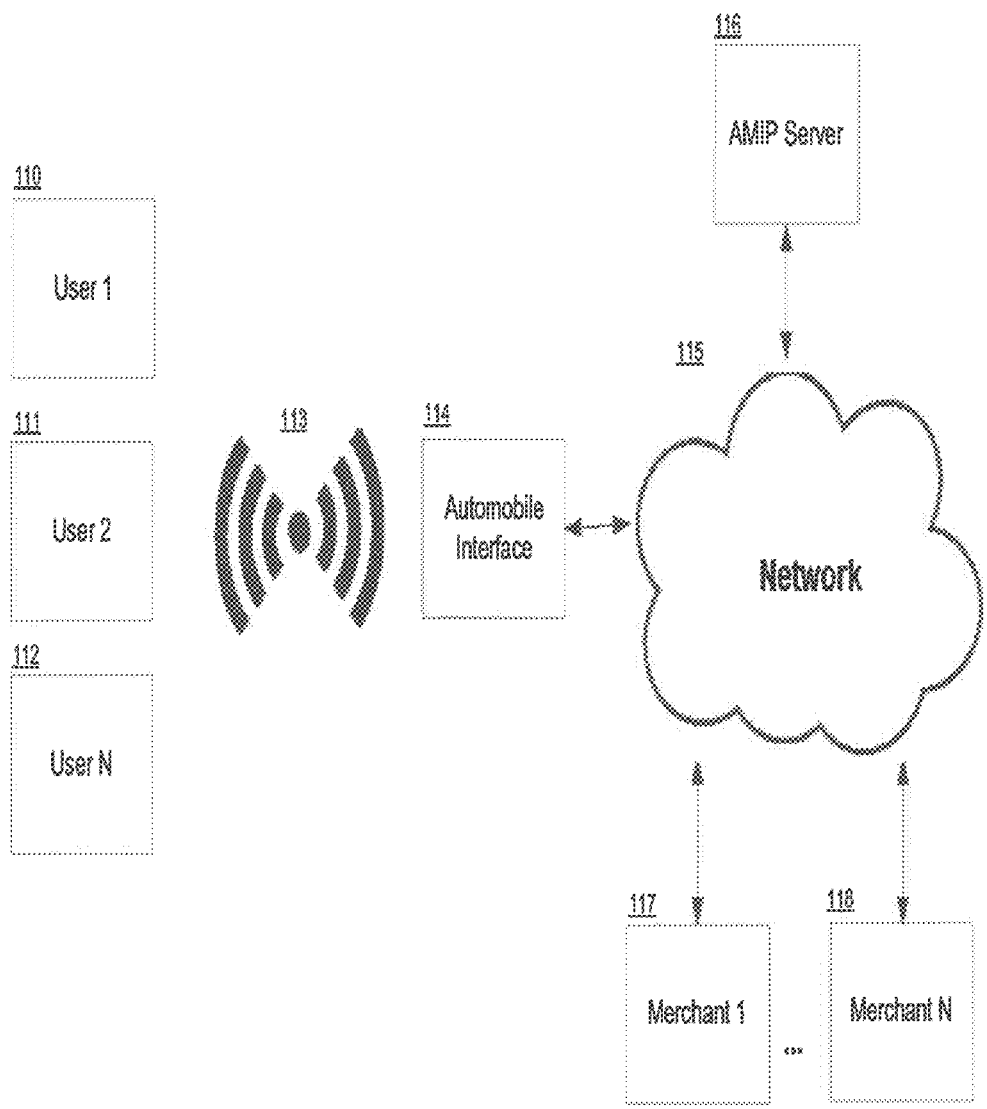

FIG. 1b show an exemplary embodiment of the AMIP system. One or more users (e.g., 110, 111, 112) may connect to an automobile interface 114. The connection may be wireless (e.g., via Bluetooth, NFC, etc.) or via cables (e.g., USB). The automobile interface 114 may communicate with the AMIP Server 116 and any number of merchants (e.g., 117 and 118) via a network 115, such as the Intent. The Automobile Interface 114 may be equipped to communicate through 3G or 4G LTE telecommunication systems, satellite, etc. In some embodiments, the Automobile interface 114 may connect to the network 115 via a user's mobile device's wireless connection (e.g., via WiFi, USB, or Bluetooth tethering).

FIG. 1c show an exemplary embodiment of the AMIP system. One or more users (e.g., 130 and 132) may use their respective mobile devices (e.g., 131 and 133), such as smart phones, to communicate with an automobile's automobile interface 134. More than one user may be connected to the automobile interface 134 at the same time. Communication between the user devices and the automobile interface 134 may be via Bluetooth, NFC, Wifi, radio frequency, etc. Alternatively, the user devices may also communicate with the automobile interface 134 via wired connections, such as USB, Firewire, etc.

The automobile interface 134 may communicate with an AMIP server 135 through a network directly or indirectly via the user's mobile device (e.g., 131 or 133). The AMIP server 135 stores or has access to a storage system (e.g., a database system) a variety of information. For example, the AMIP server 135 stores account information for users. In FIG. 1c, Account 1 (i.e., 140) is associated with User 1 (i.e., 130), and Account 2 (i.e., 145) is associated with User 2 (i.e., 132). Each user account may include information such as automobile profile(s) (e.g., 141 and 146), which may include the user's preferred automobile settings (e.g., seat position, mirror angle, radio station presets, etc.). In some implementations, the user may have an automobile profile for a particular vehicle (e.g., the user's primary vehicle), for a type of vehicle (e.g., SUV), for rental vehicles, etc.

A user account may also include one or more payment method profiles (e.g., 142 and 147), each of which may be associated with a credit card, debit account, PayPal account, etc. A user account may further include a shopping list or wish list (e.g., 143 and 148), and/or the like. The user account information may be transmitted to the automobile interface 134 by the AMIP Server 135. As described in more detail below, the automobile interface 134 may adjust/change its settings in accordance with the user account information. For example, the automobile interface 134 may cause the associated automobile to adjust its seating positions, mirror angles, radio stations, temperature, etc. according to a received automobile profile (e.g., 141 and 146). The automobile interface 134 may also store the user's payment methods (e.g., 142 and 147) at least temporarily (e.g., until the automobile is turned off) to pay for in-vehicle purchases (e.g., at a drive-through window). The automobile interface 134 may store the complete payment information (e.g., the sixteen digits of a credit card number, expiration date, etc.), or it may store a reference number (e.g., an identifier assigned by the AMIP server) to the particular user payment method, which can be used by the AMIP Server to retrieve the full payment method information. In addition to the information obtained from the AMIP server 135, the automobile interface 134 may also persist local settings/information 150, including vehicle profiles, payment methods, shopping lists, etc.

Figure 7A:
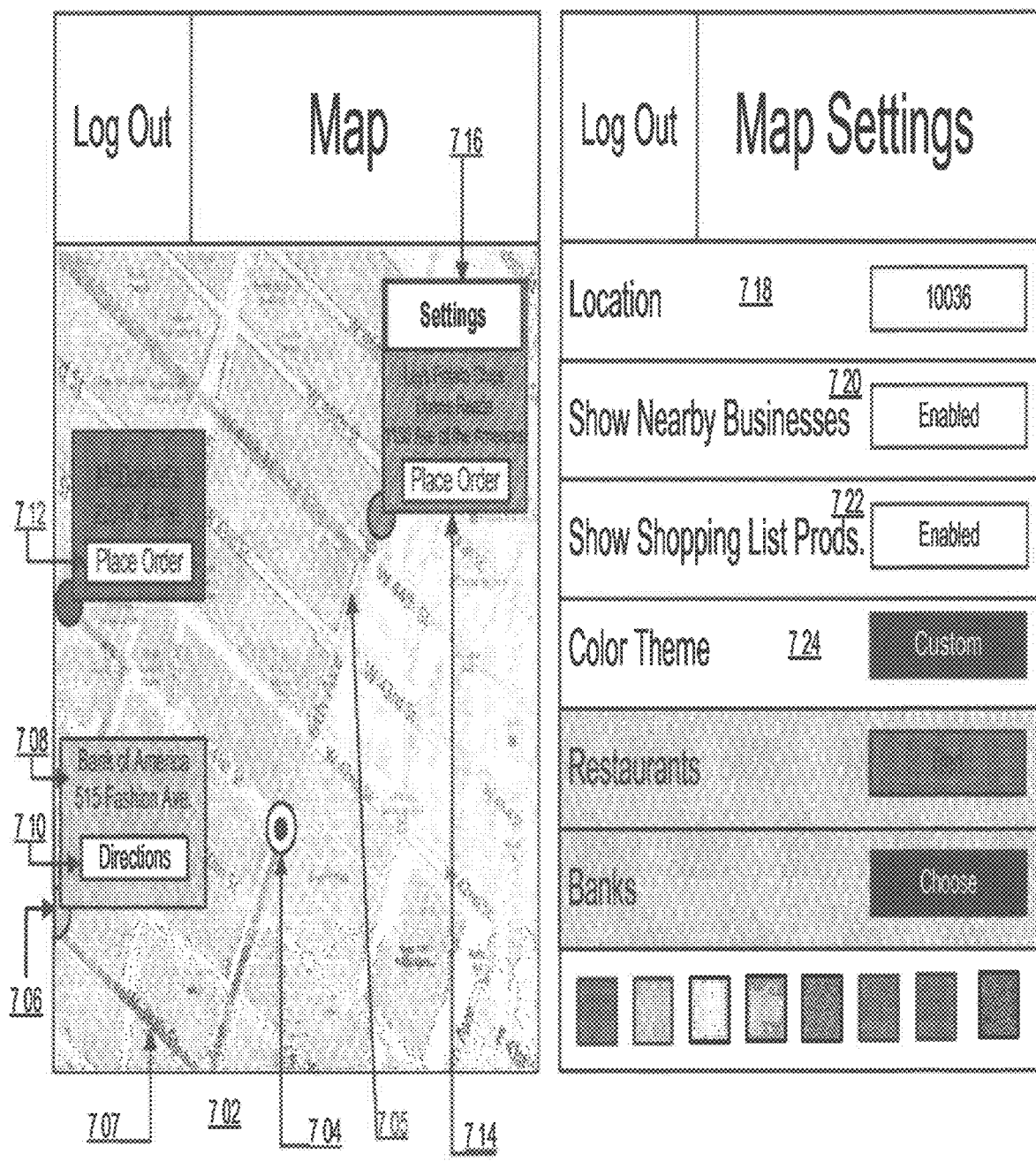
FIGS. 7a-c show block diagrams illustrating example mapping embodiments of the AMIP.
Figure 7B:
Figure 7C:
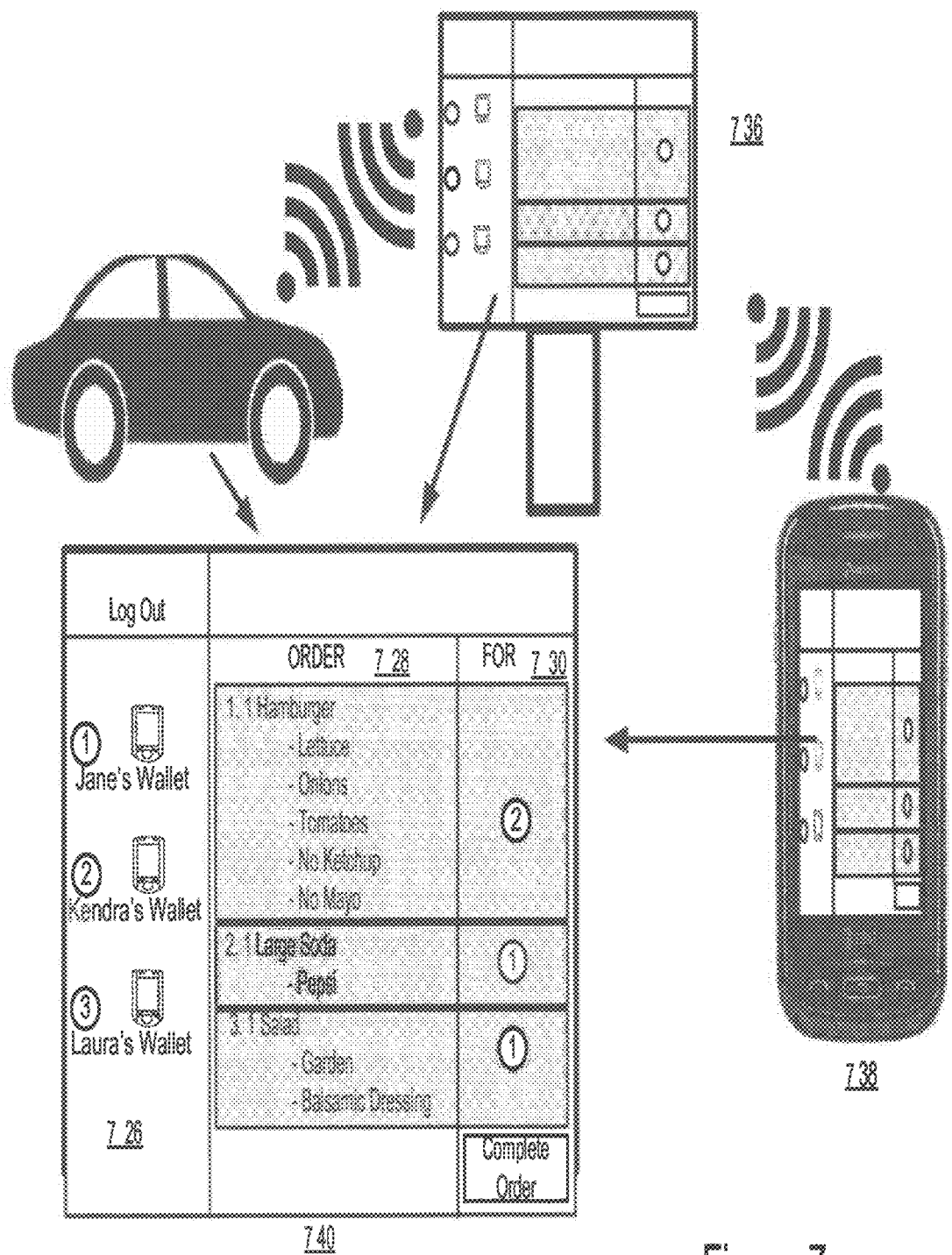

The automobile interface 134 in some embodiments may support features such as the mapping and shopping feature shown in FIGS. 7a-c. In some implementations, the AMIP server 135 may store map data 161, which may be transmitted to the automobile interface 134 to generate a visual map and navigation instructions. The AMIP server 135 may also store merchant information 162, which may include a merchant's name, address, contact information, description, and inventory data 163. In some implementations, the merchant information may be automatically mined from the Internet by the AMIP server 135, or the AMIP server 135 may provide merchants a user interface (e.g., via a web site) to enter their information. The inventory data 163 of a merchant may be supplied by the merchant's computer system 170. For example, the merchant may have an information server from which the AMIP server 135 may query for the merchant's current inventory data 163. In another implementation, the AMIP server 135 may provide a web-based interface allowing merchants to enter inventory data 163 (either automatically by the merchant system 170 or manually). Upon request, the AMIP server 135 may transmit the map data 161, merchant information 162, and/or inventory data 163 to the automobile interface 134. In some other implementations, the automobile interface 134 may directly obtain a merchant's inventory data from a merchant system when the automobile interface 134 is interacting with the particular merchant. The merchant system 170 may also communicate with the user's mobile device (e.g., 131 and 133).

Figure 2A:
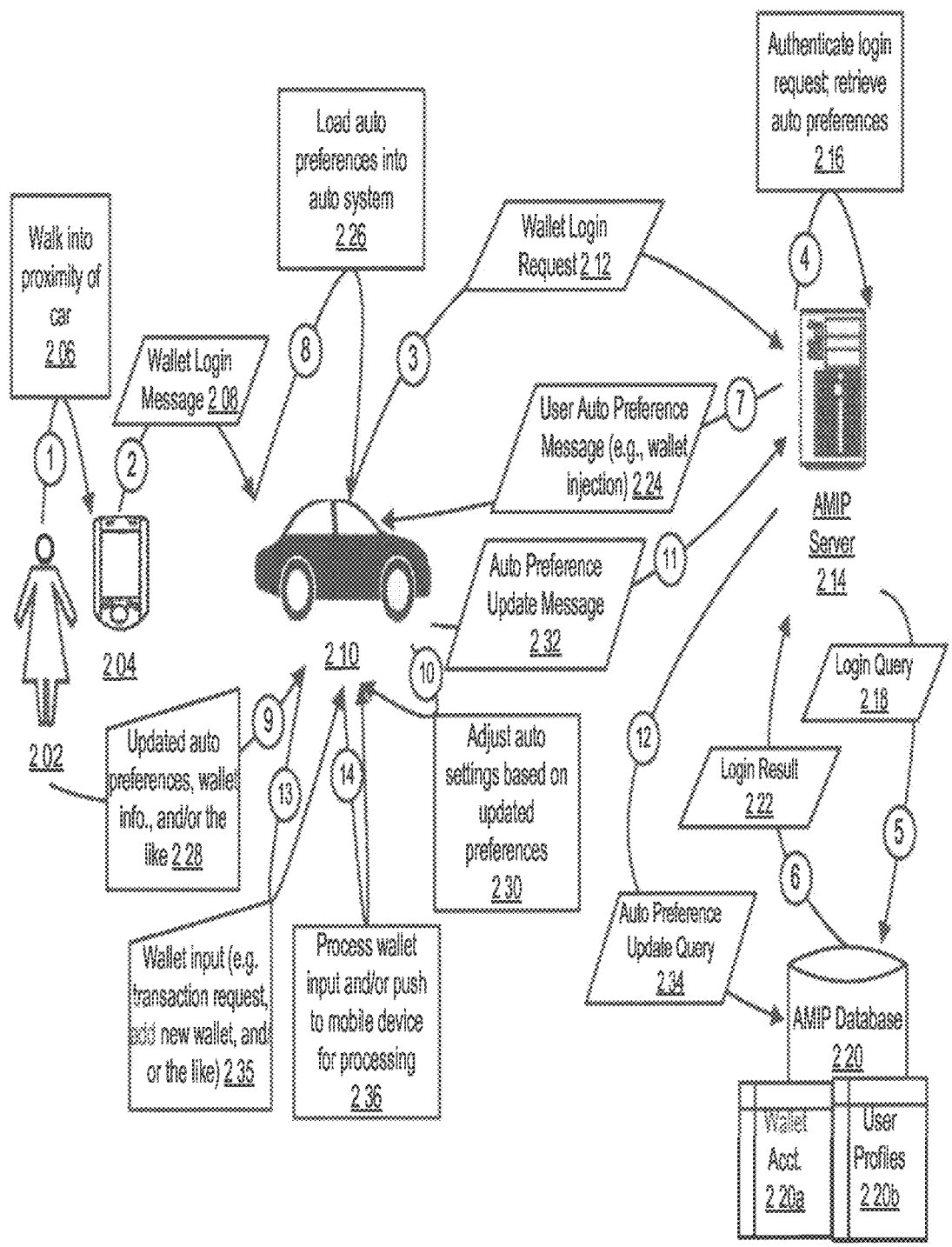
FIGS. 2a-b show data flow diagrams illustrating connecting an electronic wallet to an automobile interface in some embodiments of the AMIP.
Figure 2B:
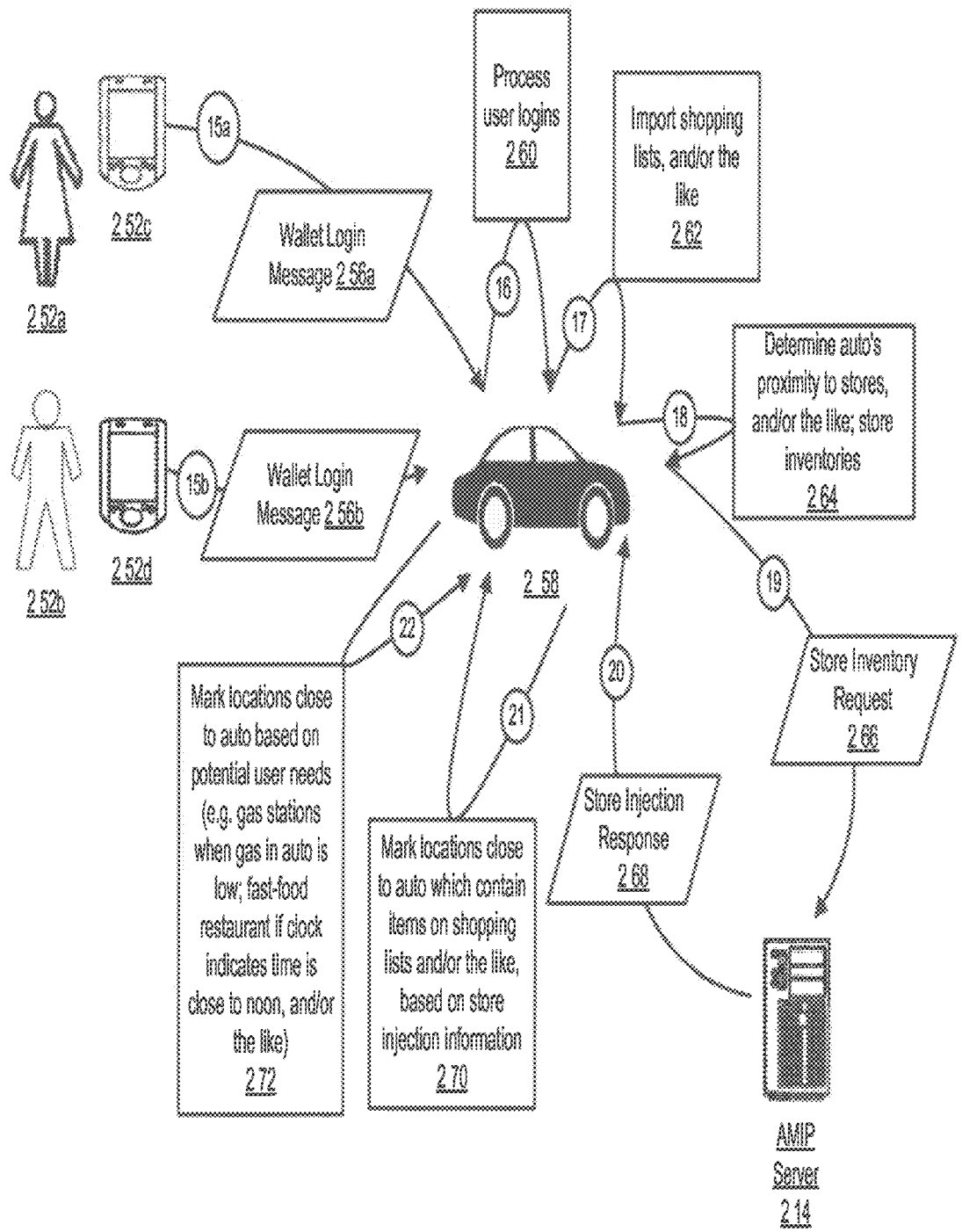

FIGS. 2a-b show data flow diagrams illustrating an embodiment for connecting a user's electronic wallet to an automobile interface. In some implementations, the user 202 may walk 206 close to her smart automobile 210 along with an electronic device 204, and cause the electronic device 204 to communicate with the smart automobile 210. In some other implementations, the user 202 may physically connect her electronic device 204 to her smart automobile 210 using a cable (e.g., USB cable). The electronic device 204 may be prompted to send a wallet login message 208 to the smart automobile 210. In some implementations, the prompt may be triggered by an NFC tag, an RFID tag, Bluetooth, the GPS locations of the device and the automobile, and/or the like. In some implementations, the wallet login message 208 may be an XML-encoded message, which may take a form similar to the following:

```
POST /wallet_login_message.php HTTP/1.1
Host: www.AMIPproccess.com
Content-Type: Application/XML
Content-Length: 788
<?XML version = "1.0" encoding = "UTF-8"?>
<wallet_login_message>
    <timestamp>2016-01-01 12:30:00</timestamp>
        <user_params>
            <user_device_ID>123456789</user_device_ID>
            <user_username>example_name</user_username>
            <user_password>********</user_password>
            <wallet_ID>A2C4E6G8I</wallet_ID>
        </user_params>
        <auto_params>
            <auto_ID>89483984739284</auto_ID>
            <user_username></user_username>
            <user_password></user_password>
        </auto_params>
    </wallet_login_message>
```

In some implementations, the automobile 210 may transmit a wallet login request 212, generated based on the wallet login message 208, to the AMIP server 214. In some other implementations, the electronic device 204 itself may transmit a wallet login request to the AMIP server 214. The AMIP server 214 may authenticate the login request 216 via a login query 218 to the AMIP database 220, and may retrieve automobile preference profiles 220b (e.g., which may include the user's payment preferences, automobile settings, etc. configured to be used with an automobile interface) that correspond to the user's wallet account 220a. In some implementations, the AMIP database 220 may then send a login result 222 to the AMIP server 214. The login result 222 may contain a reference to the wallet ID, the automobile preference profiles, and/or the like. The AMIP server 214 may then send this retrieved information back to the smart automobile 210 (or to the electronic device 204) via a user automobile preference message 224. In some implementations, the user automobile preference message 224 may be an XML-encoded message and may take a form similar to the following:

```
POST /auto_pref_message.php HTTP/1.1
Host: www.AMIPproccess.com
Content-Type: Application/XML
Content-Length: 788
<?XML version = "1.0" encoding = "UTF-8"?>
<auto_pref_message>
<timestamp>2016-01-01 12:30:00</timestamp>
    <user_params>
      <user_device_ID>123456789</user_device_ID>
      <user_username>example_name</user_username>
      <user_password>********</user_password>
      <wallet_ID>A2C4E6G8I</wallet_ID>
    </user_params>
    <auto_params>
      <auto_ID>89483984739284</auto_ID>
      <auto_profile>
         <auto_profile_name>Jane\'s Car</auto_profile_name>
         <auto_profile_temperature>
            <temp_option>schedule</temp_option>
            <temp_AC>on, low</temp_AC>
            <temp_heat>off</temp_heat>
            <temp_morning>75, F</temp_morning>
            <temp_afternoon>70, F</temp_afternoon>
            <temp_night>75, F</temp_night>
         </auto_profile_temperature>
         <auto_profile_mirrors>
            <mirrors_angles>
               <angles_mirror_R>2, add</angles_mirror_R>
               <angles_mirror_L>2, minus</andles_mirror_L>
<angles_mirror_rear>0</angles_mirror_rear>
            </mirrors_angles>
            <mirrors_autoadjust>off</mirrors_autoadjust>
         </auto_profile_mirrors>
         <auto_profile_steering>manual</auto_profile_steering>
         <auto_profile_units>US</auto_profile_units>
         <auto_profile_volume>10</auto_profile_volume>
         <auto_profile_lights>
            <lights_fog>always off</lights_fog>
            <lights_headlights_after_exit>true</lights_headlights_after_exit>
         </auto_profile_lights>
         <auto_profile_regen_breaking>always off</auto_profile_regen_breaking>
         <auto_profile_locks>
            <locks_automatic_when_starts>true</locks_automatic_when_starts>
         <locks_auto_when_away>false</locks_auto_when_away>
            <locks_child>true</locks_child>
            <locks_handles>true</locks_true>
         </auto_profile_locks>
         ...
         <auto_profile_media>
            ...
            <media_playlists>
                <playlist_IDs>7368574658348, 4i85745734985734</playlist_IDs>
            </media_playlists>
         </auto_profile_media>
      </auto_profile>
    </auto_params>
<playlist>
    <playlist_name>Jane and Friend\'s Playlist</playlist_name>
    <playlist_ID>7368574658348</playlist_ID>
    <playlist_songs>
      <songs_a>
         <song_name>Thrift Shop</song_name>
         <song_artist>Macklemore & Ryan Lewis</song_artist>
         <song_album>The Heist</song_album>
         <song_date>2012-08-29</song_date>
         <song_genre>rap</song_genre>
         ...
         <song_source>wallet, A2C4E6G8I</song_source>
      </songs_a>
      <songs_b>
         ...
      </songs_b>
      ...
    <playlist_songs>
</playlist>
<store_injection>
    <session_ID>ANAv483</session_ID>
    <timestamp>2052-01-01 12:12:15</timestamp>
    <user_id>john.q.public</user_id>
    <merchant_id>JKHVHCGV456</merchant_id>
    <store_id>1234</store_id>
    <injection_point>ENTRY</injection_point>
    <augmented_reality_flag>ON</augmented_reality_flag>
    <view_type>street view</view_type>
    <alt_view_type>map view</alt_view_type>
    <inventory_data>
        <categories>
           <books>
        ...
           <product_params>
              <product_type>Self Help</product_type>
              <product_title>XML for dummies</product_title>
              <ISBN>938-2-14-168710-0</ISBN>
              <edition>2nd ed.</edition>
              <cover>hardbound</cover>
              <price>$59</price>
              <inventory>70</ inventory>
           </product_params>
           ...
        </books>
        ...
        <electronics>
           <vendors>
           ...
              <Apple>
              ...
              <product_params>
                 <product_type>tablet</product_type>
                 <product_name>iPad</product_name>
                 <serialno>12345678</ serialno >
                 <modelno>12345</modelno>
                 <description>64GB, 4G</description>
                 <price>$829</price>
                 <inventory>7</ inventory>
              </product_params>
              ...
              </Apple>
              ...
        </electronics>
        </categories>
        <products>
        ...
        <product_params>
              <publisher_params>
                 <publisher_id>54TBRELF8</publisher_id>
                 <publisher_name>McGraw-Hill, Inc.</publisher_name>
              </publisher_params>
              <product_type>book</product_type>
              <product_params>
                 <product_title>XML for dummies</product_title>
                 <ISBN>938-2-14-168710-0</ISBN>
                 <edition>2nd ed.</edition>
                 <cover>hardbound</cover>
              </product_params>
              <inventory_level>2</inventory_level>
              <unit_cost>$14.46</unit_cost>
              <coupon_id>AY34567</coupon_id>
```

```
        </product_params>
        ...
        <product_params>
            <product_id>HJKFG345</product_id>
            <product_name>Philips
Sonicare</product_name>
            <vendor_name>Philips, Inc.</vendor_name>
            <model>EH57</model>
            <product_type>Toothbrush</product_type>
            <inventory_level>12</inventory_level>
            <unit_cost>$34.78</unit_cost>
            <coupon_id>null</coupon_id>
        </product_params>
        ...
    </products>
    ...
</inventory_data>
<store_injection_enhanced_interface_data>
    <floorplan_URL>www.inject.com?id=
ANAv483&type=img</floorplan_URL>
    <UI_script_URL>www.inject.com?id=
ANAv483&type=script</UI_script_URL>
    <ShopAssistant_UIbundle_url>www.inject.com?id=
ANAv483&type=bundle</ShopAssistant_UIbundle_url>
    <AugmentedRealityFloorplanCartPinOverlayUI_html5_url>
www.inject.com?id=
ANAv483&type=html5</
AugmentedRealityFloorplanCartPinOverlayUI_html5_url>
    <InteractiveStore_flash_url>www.inject.com?id=
ANAv483&type=flash</InteractiveStore_flash_url>
</store_injection_enhanced_interface_data>
</store_injection>
</auto_pref_message>
```

The smart automobile may then load the preference profiles (e.g., automobile temperature, mirror, radio, music playlist settings, etc.), wallet data, and/or the like into the automobile's computer system 226.

In some implementations, the user may periodically update her automobile preferences, her wallet information, and/or the like, via the automobile interface 228. The automobile may update the automobile's settings in accordance with the user's inputs 230, and may also send the updated information to the AMIP server via an automobile preference update message 232. In some implementations an automobile preference update message 232 may be an XML-encoded message and may take a form similar to the following:

```
POST /auto_pref_message.php HTTP/1.1
Host: www.AMIPproccess.com
Content-Type: Application/XML
Content-Length: 788
<?XML version = "1.0" encoding = " UTF-8"?>
<auto_pref_message>
<timestamp>2016-01-01 12:30:00</timestamp>
  <user_params>
    <user_device ID>123456789</user_device_ID>
    <user_username>example_name</user_username>
    <user_password>********</user_password>
    <wallet_ID>A2C4E6G8I</wallet_ID>
  </user_params>
  <auto_params>
    <auto_ID>89483984739284</auto_ID>
    <auto_profile>
      <auto_profile_name>Jane\'s Car</auto_profile_name>
      <auto_profile_temperature>
        <temp_option>schedule</temp_option>
        <temp_AC>on, low</temp_AC>
        <temp_heat>off</temp_heat>
        <temp_morning>75, F</temp_morning>
        <temp_afternoon>70, F</temp_afternoon>
        <temp_night>75, 5</temp_night>
      </auto_profile_temperature>
      <auto_profile_mirrors>
        <mirrors_angles>
          <angles_mirror_R>2,
add</angles_mirror_R>
          <angles_mirror_L>2, minus</andles_mirror_L>
<angles_mirror_rear>0</angles_mirror_rear>
        </mirrors_angles>
        <mirrors_autoadjust>off</mirrors autoadjust>
      </auto_profile_mirrors>
      <auto_profile_steering<manual</auto_profile_steering>
      <auto_profile_units>US</auto_profile_units>
      <auto_profile_volume>10</auto_profile_volume>
      <auto_profile_lights>
        <lights_fog>always off</lights_fog>
        <lights_headlights_after_exit>
true</lights_headlights_after_exit>
      </auto_profile_lights>
      <auto_profile_regen_breaking<always
off</auto_profile_regen_breaking>
      <auto_profile_locks>
        <locks_automatic_when starts>true
</locks_automatic_when starts>
      <locks_auto_when away>false</locks auto_when_away>
          <locks_child>true</locks_child>
          <locks_handles>true</locks_true>
      </auto_profile_locks>
      ...
      <auto_profile_media>
        ...
        <media_playlists>
              <playlist_IDs>7368574658348,
4i85745734985734</playlist_IDs>
        </media_playlists>
      </auto_profile_media>
      <auto_bonds>
        <bond_ID>3876825468726>/bond_ ID>
        <bond_wallet_IDs>832473874e73a, 89a68e767fa8f78,
93248234b3230943f</bond_wallet_IDs>
        <bond_transaction>
          <transaction_payer> (832473874e73a, 25),
(89a68e767fa8f78, 25) </transaction_payer> //shows two payers
each contributing $25
          <transaction_recipient>(93248234b3230943f,
50) </transaction_recipient> //recipient can be a prepaid account
associated with the automobile in some embodiments
        </bond_transaction>
      </auto_bonds>
    </auto_profile>
  </auto_params>
<playlist>
  <playlist_name>Jane and Friend\'s Playlist</playlist_name>
  <playlist_ID>7368574658348</playlist_ID>
  <playlist_songs>
    <songs_a>
      <song_name>Thrift Shop>/song_name>
      <song_artist>Macklemore & Ryan
Lewis</song_artist>
      <song_album>The Heist</song_album>
      <song_date>2012-08-29</song_date>
      <song_genre>rap</song_genre>
      ...
      <song_source>wallet, A2C4E6G8I</song_source>
    </songs_a>
    <songs_b>
      ...
    </songs_b>
    ...
  <playlist_songs>
</playlist>
<store_injection>
  <session_ID>ANAv483</session_ID>
  <timestamp>2052-01-01 12:12:15</timestamp>
  <user_id>john.q.public</user_id>
  <merchant_id>JKHVHCGV456</merchant_id>
  <store_id>1234</store id>
  <injection_point>ENTRY</injection_point>
  <augmented_reality_flag>ON</augmented_reality_flag>
  <view_type>street view</view_type>
  <alt_view_type>map view</alt_view_type>
```

```xml
<inventory_data>
    <categories>
        <books>
            ...
            <product_params>
                <product_type>Self Help</product_type>
                <product_title>XML for dummies</product_title>
                <ISBN>938-2-14-168710-0</ISBN>
                <edition>2nd ed.</edition>
                <cover>hardbound</cover>
                <price>$59</price>
                <inventory>70</inventory>
            </product_params>
            ...
        </books>
        ...
        <electronics>
            <vendors>
                ...
                <Apple>
                    ...
                    <product_params>
                        <product_type>tablet</product_type>
                        <product_name>iPad</product_name>
                        <serialno>12345678</serialno>
                        <modelno>12345</modelno>
                        <description>64GB, 4G</description>
                        <price>$829</price>
                        <inventory>7</inventory>
                    </product_params>
                    ...
                </Apple>
                ...
        </electronics>
    </categories>
    <products>
        ...
        <product_params>
            <publisher_params>
                <publisher_id>54TBRELF8</publisher_id>
                <publisher_name>McGraw-Hill, Inc.</publisher_nme>
            </publisher_params>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
            </product_params>
            <inventory_level>2</inventory_level>
            <unit cost>$14.46</unit cost>
            <coupon_id>AY34567</coupon_id>
        </product_params>
        ...
        <product_params>
            <product_id>HJKFG345</product_id>
            <product_name>Philips Sonicare</product_name>
            <vendor_name>Philips, Inc.</vendor_name>
            <model>EH57</model>
            <product_type>Toothbrush</product_type>
            <inventory_level>12</inventory_level>
            <unit_cost>$34.78</unit_cost>
            <coupon_id>null</coupon_id>
        </product_params>
        ...
    </products>
    ...
</inventory_data>
<store injection enhanced interface data>
    <floorplan_URL>www.inject.com?id=ANAv483&type=img</floorplan_URL>
    <UI script URL>www.inject.com?id=ANAv483&typ=script<UI_script_URL>
    <ShopAssistant_UIbundle_url>www.inject.com?id=ANAv483&type=bundle</ShopAssistant_UIbundle_url>
    <AugmentedRealityFloorplanCartPinOverlayUI_htm15._url>www.inject.com?id=ANAv483&type=html5</AugmentedRealityFloorplanCartPinOverlayUI_htm15_url>
        <InteractiveStore_flash_url>www.inject.com?id=ANAv483&type=flash</InteractiveStore_flash_url>
    </store_injection_enhanced_interface_data>
</store_injection>
</auto_pref_message>
```

In some implementations, the server may store the updated preferences in the AMIP database via an automobile preference update query 234 to the database. In some implementations, the automobile may also receive wallet-related input (such as transaction requests, adding new payment methods, adding new payment devices to currently-connected wallet accounts, and/or the like) from the user 235, and may process 236 the input directly in the automobile interface, or may push processing of the wallet data to the user's default electronic wallet-enabled mobile device, and/or a like device external from the automobile.

In some implementations, multiple users may wish to connect their electronic wallets to the automobile interface. Regarding FIG. 2*b*, in some implementations, a user 252*a* and a user 252*b* may wish to connect their electronic wallets to the automobile 258. User 252*a* may use her electronic device 252*c*, and user 252*b* may use his electronic device 252*d*, to each send a wallet login message, respectively 256*a* and 256*b*, to the automobile interface of the automobile 258. In some implementations, the wallet login message may be similar to wallet login message 208 in FIG. 2*a*. In some implementations, the automobile interface may process the login for each user 260 (see FIG. 2*a*) and retrieve their respective wallet information from the AMIP database. In some implementations, the wallet information retrieved from the AMIP database may include shopping lists, preferred merchants, wish lists, and/or the like. The automobile interface may then import 262 the wallet information into its system.

In some embodiments, the automobile interface may provide the users (e.g., 252*a* and 252*b*) assistance with locating the products/services on their shopping lists, and/or provide targeted advertisements and recommendations from nearby merchants. For example, the automobile interface may generate a dynamic map showing the automobile's 258 current location and surroundings, along with indications (e.g., graphical icons, audible notices, etc.) of nearby merchants that may be of interest to the users. For example, the automobile interface may determine the location of such merchants to determine the automobile's proximity to the merchant 264, and overlay icons over the map to represent the location of the closest merchants. In one implementation, the user's shopping list (or merchant list, etc.) may include product and/or merchant information (e.g., dish soap at Target, milk at supermarket, etc.), which the automobile interface may use to search for nearby merchants fitting that description. For example, if the shopping list includes a specific merchant's name (e.g., Target), the automobile interface may search for nearby merchants (e.g., within a 5 mile radius of the automobile's location) matching the listed name. As another example, if the shopping list includes a category of merchant (e.g., supermarket), the automobile interface may reference a repository of known merchants included in that category (e.g., by performing a database query for merchants under the "supermarket" category). If the user's list only includes a product/service name or type, the automobile interface may use, e.g., a look up table to determine the general merchant types or specific merchants that may offer the listed product/service. A person of ordinary skill in the art would recognize that the aforementioned process for determining merchants of interest may also be performed by a remote AMIP server 214.

In some implementations, the automobile interface may determine the location of various products on the users' shopping and/or wish lists by sending a store inventory request 266 to the AMIP server, in order to determine which of the merchants in close proximity to the automobile have the product in stock. The inventory request 266 may include a list of products and/or merchants of interest to the user. The inventory request may also include the automobile's 258 geographic location based on information supplied by, e.g., the automobile's 258 GPS unit. The AMIP server may search its database for merchants within a certain distance from the automobile's 258 location that match a specified merchant description (e.g., merchant name, such as Target, or merchant type, such as supermarket) or that offer a listed product/service (e.g., milk).

In some implementations, the AMIP server may query servers associated with the identified merchants to determine the availability, price, and other pertinent information of the interested products. For example, if the user is interested in milk, the AMIP server may query each nearby supermarket to determine the availability, brand, and price of the milk in-stock.

The AMIP server may send a store injection response 268 (see FIG. 9*c-d*) back to the automobile, identifying the merchants which have been found (e.g. merchants from the user's preferred merchant list, or merchants selling an item on the user's wish and/or shopping lists), their product inventories, and other pertinent information (e.g., prices, store hours, etc.). In some implementations, the store injection response 268 may appear similar to the user automobile preference message 224 (see FIG. 2*a*), but may contain information for each merchant on a particular route. The automobile interface may then analyze the store injection response 268 and select the merchants to display. For example, the selection may be based on user preferences, distance between the merchant and the automobile, product price, user reviews, and/or whether the merchant is a sponsor of AMIP service, etc. The selection process may also be performed by the AMIP server 214, in which case the automobile interface may simply display every merchant included in the store injection response 268 from the AMIP server 214. The automobile interface may update the map it generated to indicate the locations of the selected merchants 270 (e.g. because a shopping and/or wish list item is available at the merchant, because the merchant is on the user's preferred merchant list, and/or the like).

Additionally, the automobile interface may mark locations on the map based on predictions (e.g., heuristics) of what the user may be interested in 272. For example, the automobile may mark a location for buying gasoline if the automobile is running low on gasoline (determined based on the automobile's fuel sensor); the automobile may mark fast-food restaurants in the area on the map if the automobile's internal clock system indicates that the time is close to a meal time (e.g., noon, 7 pm, etc.); the automobile may mark a location that serve refreshments if the automobile's thermostat indicates extreme weather (e.g., hot or cold); the automobile may mark a location with a particular product that is deemed similar to one on the user's shopping list, or is commonly-purchased along with a product on the user's wish list, and/or the like.

Figure 3B:
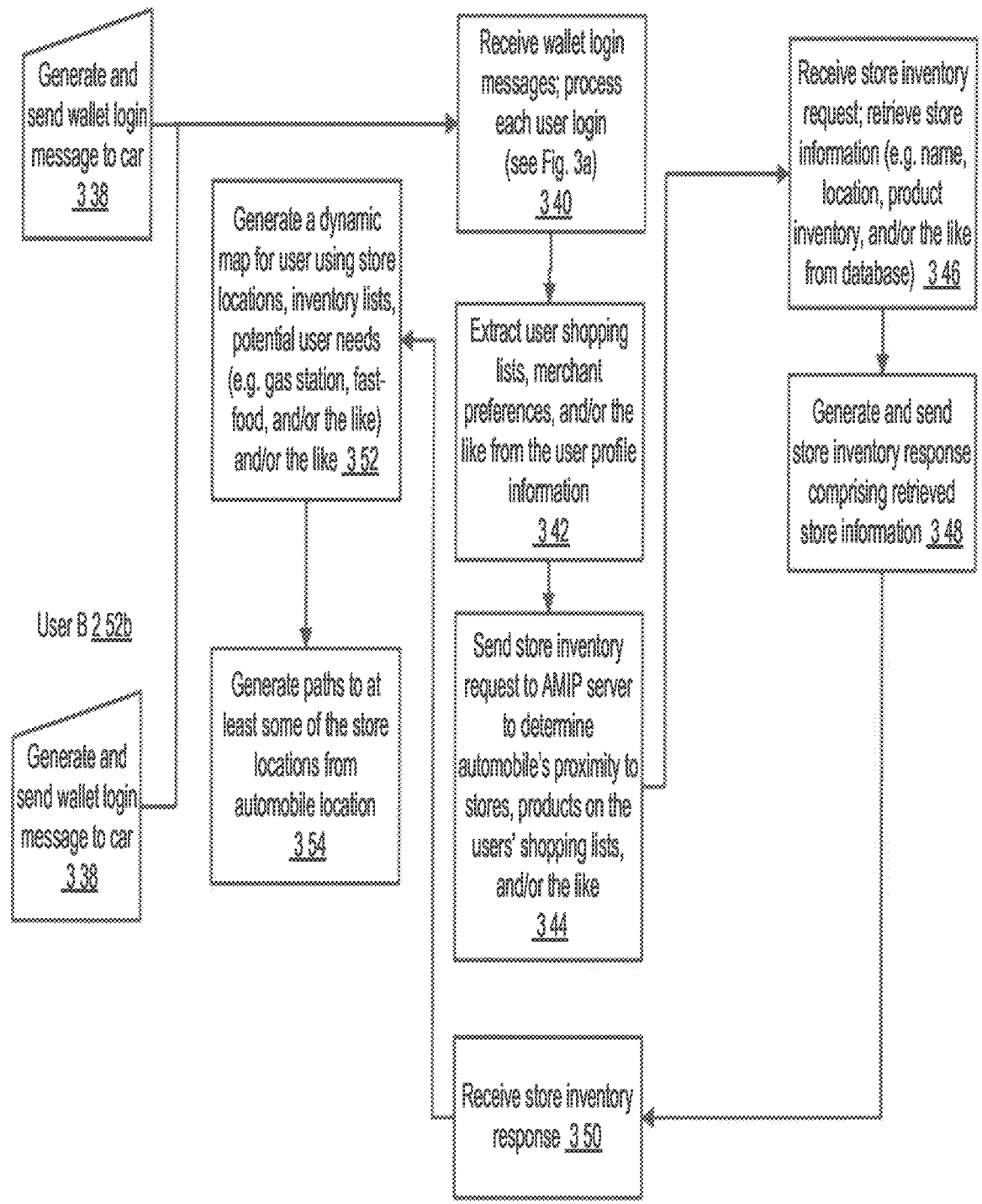

FIGS. 3*a-b* show logic flow diagrams illustrating an electronic wallet connecting to an automobile interface in some embodiments of the AMIP. In some implementations, the user may walk into the proximity of the car 302, which may prompt her device to generate and send a wallet login message 304 to the automobile. After receiving the wallet login message 306, the automobile may generate and send a wallet login request 308 to the AMIP server. Alternatively, in another implementation the user's device may send a login message to the AMIP server, receive an authentication token, and act as the bridge between the automobile interface and the AMIP server.

The AMIP server may receive the login request 310 from the automobile, and use the credentials within the request to authenticate the user's wallet login 312. If the authentication is unsuccessful 314, then the server may send a message 316 to the user indicating that her credentials were invalid and/or the user was otherwise unable to authenticate her wallet login. If the authentication is successful 314, then the AMIP server may query a database for user profile information 317 (e.g. automobile profiles, wallet profiles, and/or the like) linked to the user's wallet account, and may generate and send a preferences response 318 back to the automobile (which in some implementations may be sent via the user's device). The automobile may receive 320 those preferences, and may load them 322 into the automobile's system in order to update/actuate the automobile's settings. For example, based on the user preferences received, the automobile may adjust the seats, mirrors, radio stations, etc., and/or store, at least temporarily, the user's payment information/profile.

The user may update the car settings, her wallet information (e.g., may add payment devices, edit shopping and/or wish lists, and/or the like), and/or perform like tasks via the automobile interface 324. In response, the automobile may then make corresponding adjustments 326 and send an automobile preference update message to the AMIP server 328 (or alternatively cause the user's device to send the update message to the AMIP server). The AMIP server may receive the update message and store the updated information in its database 330.

The automobile may also receive wallet-related input from the user 334, such as a transaction request, a new wallet profile, and/or the like. The automobile interface may perform the tasks requested by the user input, or it may push the request to the user's mobile electronic device for processing 336 (e.g. the user's default electronic device, the user's last-used electronic device, and/or the like). For example, if the user wishes to make a payment using a particular credit card linked to her wallet account, the automobile interface may transmit the credit card information to a nearby card reader (e.g., using RFID or NFC technology), or alternatively the automobile interface may cause the user's device to make the transmission using whatever communication means available.

Regarding FIG. 3*b*, the user and at least a second user may login to their wallet account in the same automobile via their electronic devices. User A (i.e., 252*a*) and User B (i.e., 252*b*) may cause their respective mobile devices to generate and send a wallet login message 338 to the automobile (i.e., 258) such that both users are logged in at the same time. The automobile may process the login for each user 340 similar to the fashion in which it is processed in FIG. 3*a*. The automobile may then extract user information (e.g., shopping lists, merchant preferences, and/or like information) from each of the user's the profile information 342. The automobile may send a store inventory request 344 to the AMIP server, similar to the process described above, in order to determine the automobile's proximity to merchants that may be of interest to the users (e.g., merchants that offer products/services listed on either user's lists). The server may, upon receiving the request, retrieve merchant information from the AMIP database, such as merchant names, merchant locations, merchant product inventories, and/or the like 346. In some implementations the information may be retrieved in the form of a store injection packet (see FIG. 9*c*-*d*). The AMIP server may, in come implementations, select a set of merchants based on any selection criteria, such as distance from the automobile, merchant reviews, product pricing, etc. The AMIP server may then generate and send a response 348 to the automobile comprising the retrieved (and selected) information (e.g., may include the merchant name, location, contact information, product inventory information, etc.) In some implementations, the merchants and/or products in the response may be associated with a particular user (e.g., User A or User B), depending on which user's profile was the basis for selecting the merchant and/or product. Upon receiving the information 350, the automobile may generate a dynamic map 352, which may include indications of merchant locations, inventory lists, potential user needs, and/or the like. For example, the generated map may indicate the automobile's current location and locations of merchants and/or desired products that may be of interest to the user. In some implementations, the map may include visual cues separating the merchants and/or products that may be of interest to User A from those that may be of interest to User B (e.g., information targeted for User A may be presented in red, information for User B may be presented in blue, and information that may be of interest to both may be in purple). The automobile may also generate paths 354 for the user to at least some of the locations it places on the map, based on the automobile's proximity to the store, based on the fastest path to at least one item on a user's wish and/or shopping list, based on the best path to all merchants the user would like to visit, and/or the like.

Figure 4A:
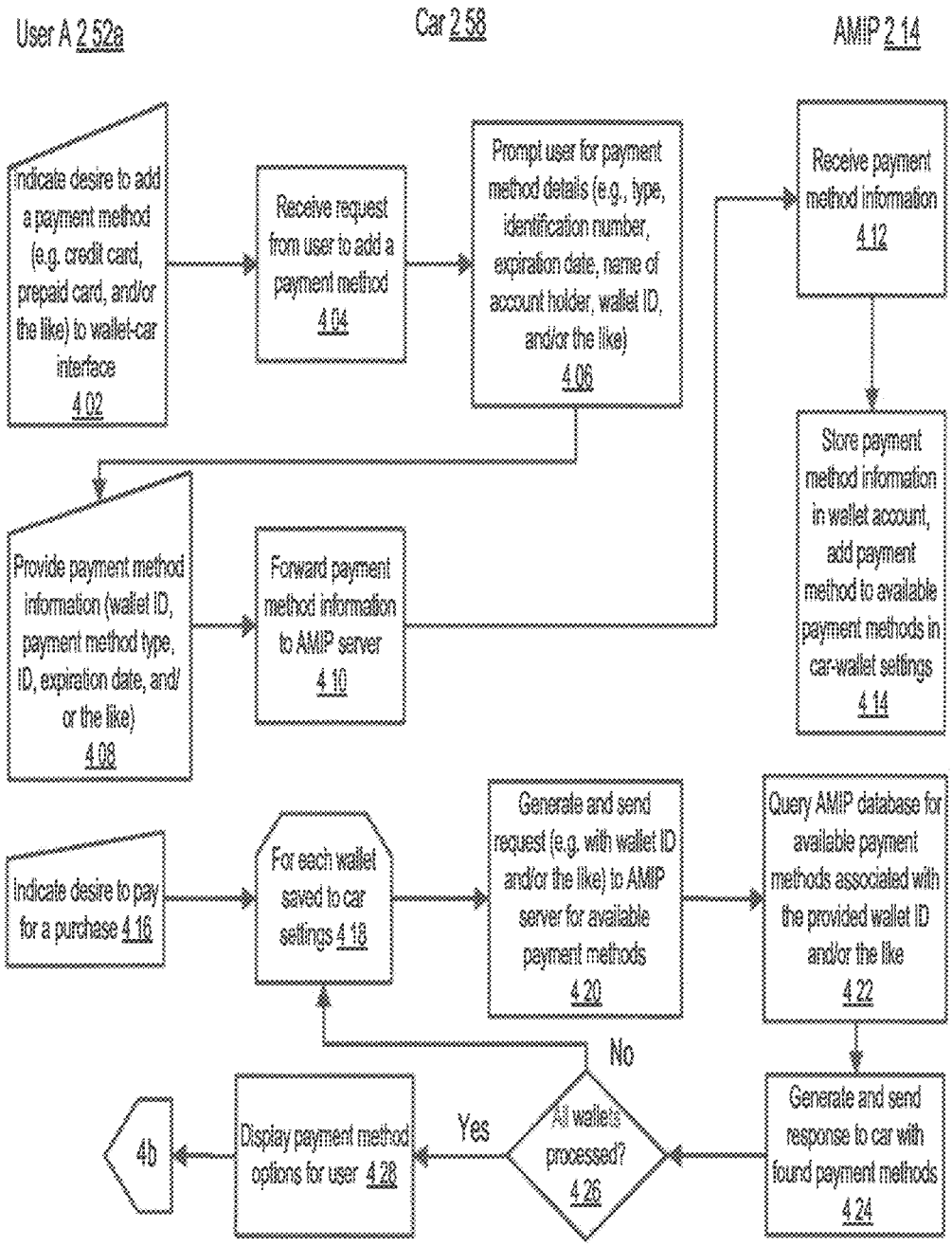
FIGS. 4a-b show logic flow diagrams illustrating conducting payments in a wallet-automobile interface in some embodiments of the AMIP.
Figure 4B:
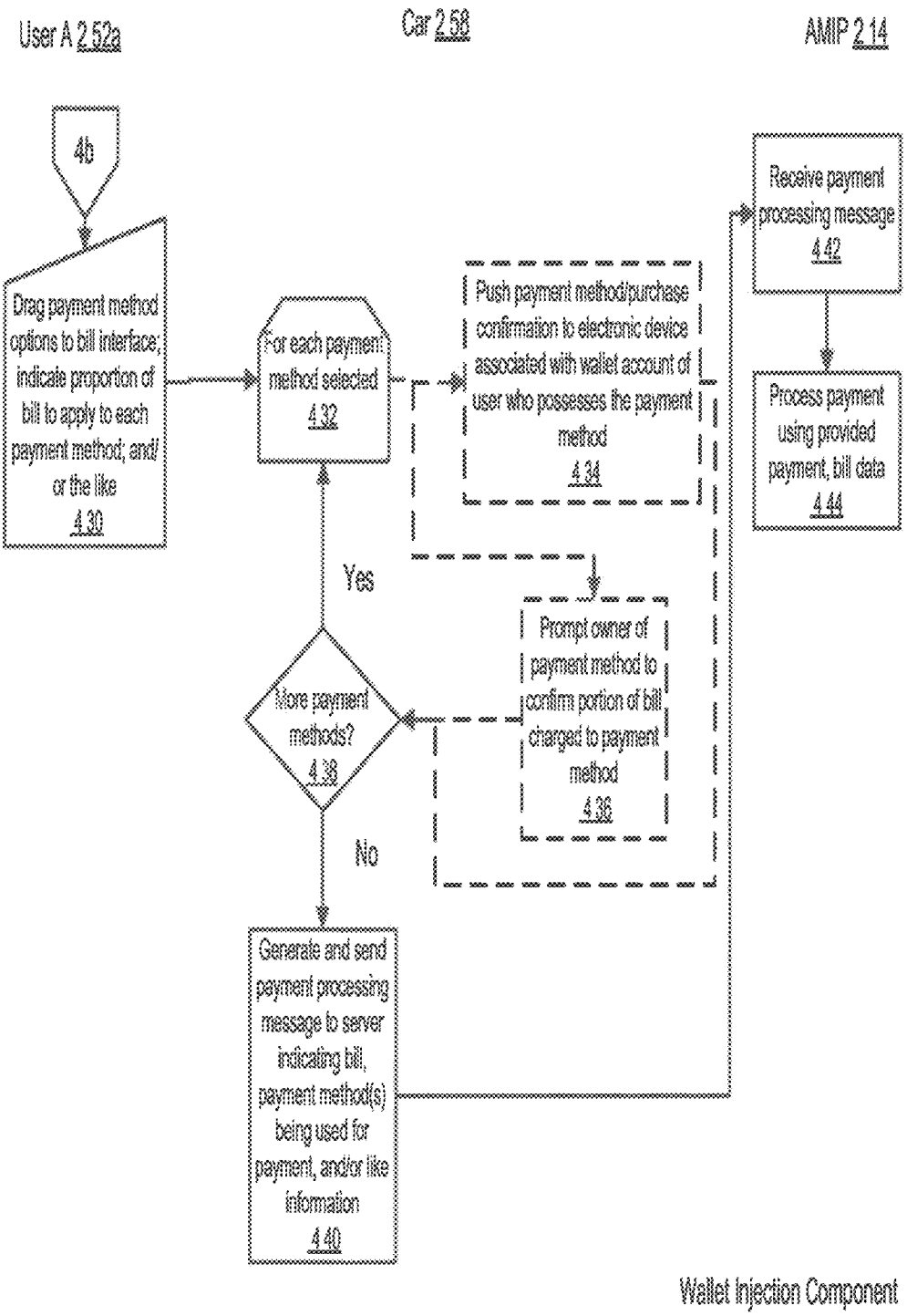

FIGS. 4*a*-*b* show logic flow diagrams illustrating conducting payments in a wallet-automobile interface in some embodiments of the AMIP. In some implementations, a user (e.g., User A 252*a*) may wish to add a payment method (e.g. credit card, prepaid card, gift card, debit card, and/or the like) to her automobile profile and/or online wallet profile. The user may indicate, via the automobile and/or her mobile device interface, that she would like to add a payment method 402. After receiving the request 404, the automobile may prompt the user to provide details pertaining to the payment method 406. In some implementations such information may include the type of payment method (e.g. credit card, debit card, prepaid card, gift card, and/or the like), the identification number for the payment method, the expiration date, the account holder's name (if applicable), the wallet to which they payment method is being added, and/or the like. After the user provides the requested information to the automobile and/or electronic devices 408, the automobile and/or electronic device may forward the information to the AMIP server 410. After receiving the information 412, the server may store the payment method information in the user's wallet account, and/or indicate whether the added payment method can be used via an automobile interface 414 (e.g., a reference to the payment method may be added to the user's automobile profile; the payment method may be associated with a flag indicating whether it should be made available via an automobile interface; etc.).

In some implementations, a user may indicate a desire to pay for a purchase 416 using payment methods in her automobile profile and/or the like. In some implementations the automobile may, for each wallet imported into the automobile interface 418, generate and send a request to the AMIP server for available payment methods 420 in the user's profile account. In some implementations the automobile may send information such as the user's wallet ID, the user's wallet login information, and/or the like to the AMIP server. In some implementations the server may query a database 422 for available payment methods which are associated with the user's wallet information, and may generate and send a response 424 to the automobile indicating which payment methods were found. If there are more wallets to process 426 (e.g., if both User A and User B are logged in and have individual profile accounts), the automobile may send another request to the server for further payment methods. In some implementations, the automobile may send a batch request to the server for all the wallets at once. Once all wallet payment methods have been obtained, the automobile may display 428 all of the payment method options for the user(s). In another implementation, the automobile may obtain the payment methods from the AMIP server when the user(s) first logs into the car (e.g., when he/she enters the automobile), rather than wait until the moment at which the user(s) indicates a desire to pay. In some implementations, the process for obtaining the payment methods may be similar to the process flow depicted in FIG. 4*a*.

Referring to FIG. 4*b*, the user may select the payment method(s) to use, as well as the amount to charge to each payment method via the automobile interface 402. The automobile interface may be implemented to support a variety of input methods. For example, the user may touch and drag a desired payment method from a list onto a bill 430 (e.g., the bill as a whole, a particular item on the bill, and/or the like). In another example, the user may choose the payment method from a drop-down list, and/or the like. The user may also specify the amount or proportion of the bill to be charged to the selected payment method. The user may do so by using a keyboard, a selection module, e.g., a slidebar, and/or the like. In some implementations, for each payment method selected 432 to be used towards a bill, the automobile may either prompt the owner of the payment method 436 to confirm the pending charges via the automobile interface, or push the purchase confirmation to the owner's electronic device of each user who has a payment device in use for the bill 434. In either case, each owner of the selected payment methods may confirm/authorize the pending charges to his/her payment method. Once all the charges to the selected payment methods have been confirmed 438, the automobile interface may generate and send a payment processing message to the server 440 including information about the bill, payment methods being used (including information pertaining to the wallets to which they are associated), the amount being charged to each payment method, and/or the like. After receiving 442 the payment processing message, the server may process the user's payment 444 (e.g. by communicating with relevant members of the users' payment processing network).

Figure 5A:
FIGS. 5a-b show block diagrams illustrating some embodiments of the AMIP.
Figure 5B:
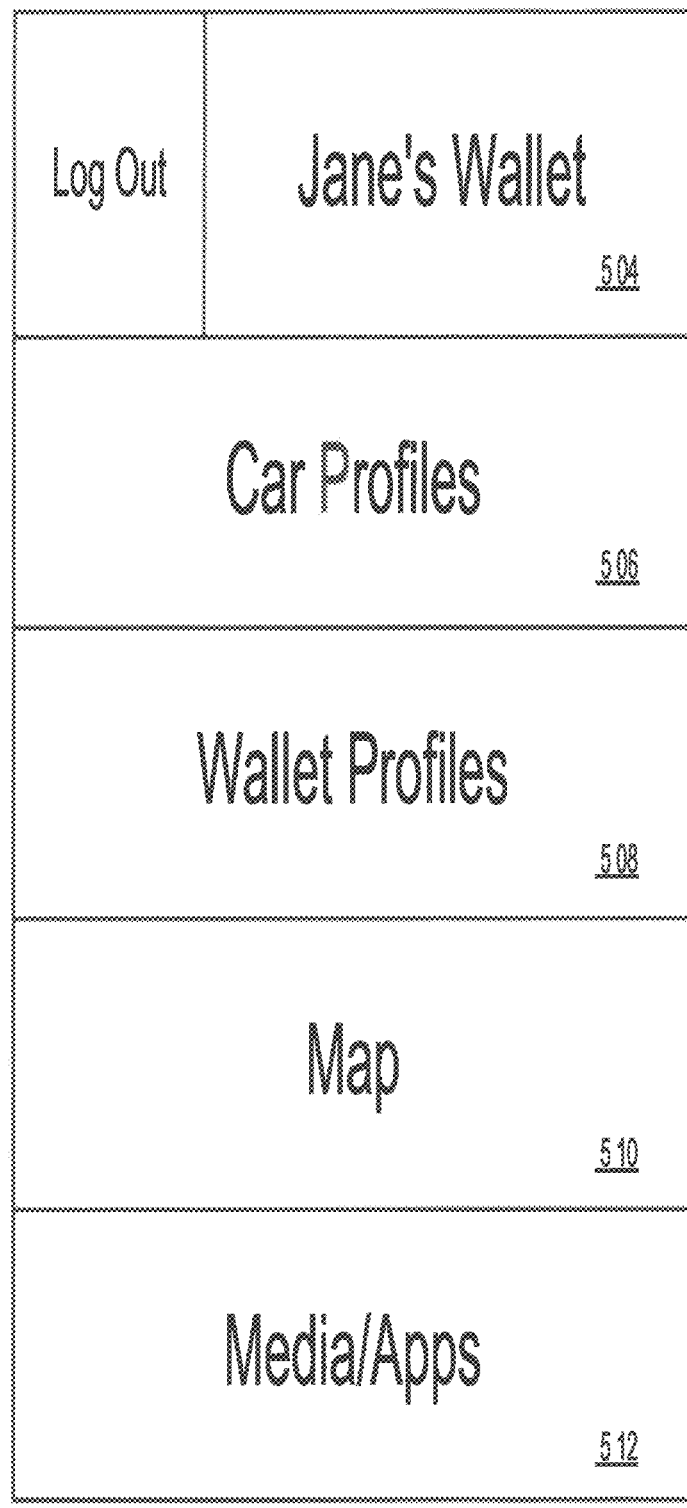

FIGS. 5*a*-*b* show block diagrams illustrating some embodiments of the AMIP. In some implementations, a user entering her automobile may trigger a start screen to be displayed on the automobile interface. The trigger may be, for example, in response to the user entering or shutting the automobile's door or starting the engine, etc., or it may be in response to the automobile interface detecting the user's device via any wired (e.g., USB) or wireless means (e.g., NFC, RFID, Bluetooth, etc.). An example of a start screen 502a is shown on FIG. 5a. The start screen may prompt the user to enter her wallet credentials (e.g., username and password). In other implementations, the automobile interface may automatically receive the user's credentials from her electronic device 502b (e.g., via NFC, RFID, Bluetooth, USB, etc.). The automobile interface may use the obtained credentials to log into the user's account with the AMIP server 502b. FIG. 5b shows an exemplary screen shot of what the user may see after her credentials have been verified. For example, she may see the name of her wallet 504, an option to view her automobile profiles 506 (e.g., it may contain automobile configurations and payment methods to be used in an automobile), an option to view her wallet profiles 508 (e.g., it may contain all the user's payment methods and not just the ones available via an automobile interface), an option to view maps 510 on the automobile interface, and an option to use media (e.g. music, videos, and/or the like) and/or applications 512 via the automobile interface.

Figure 6A:
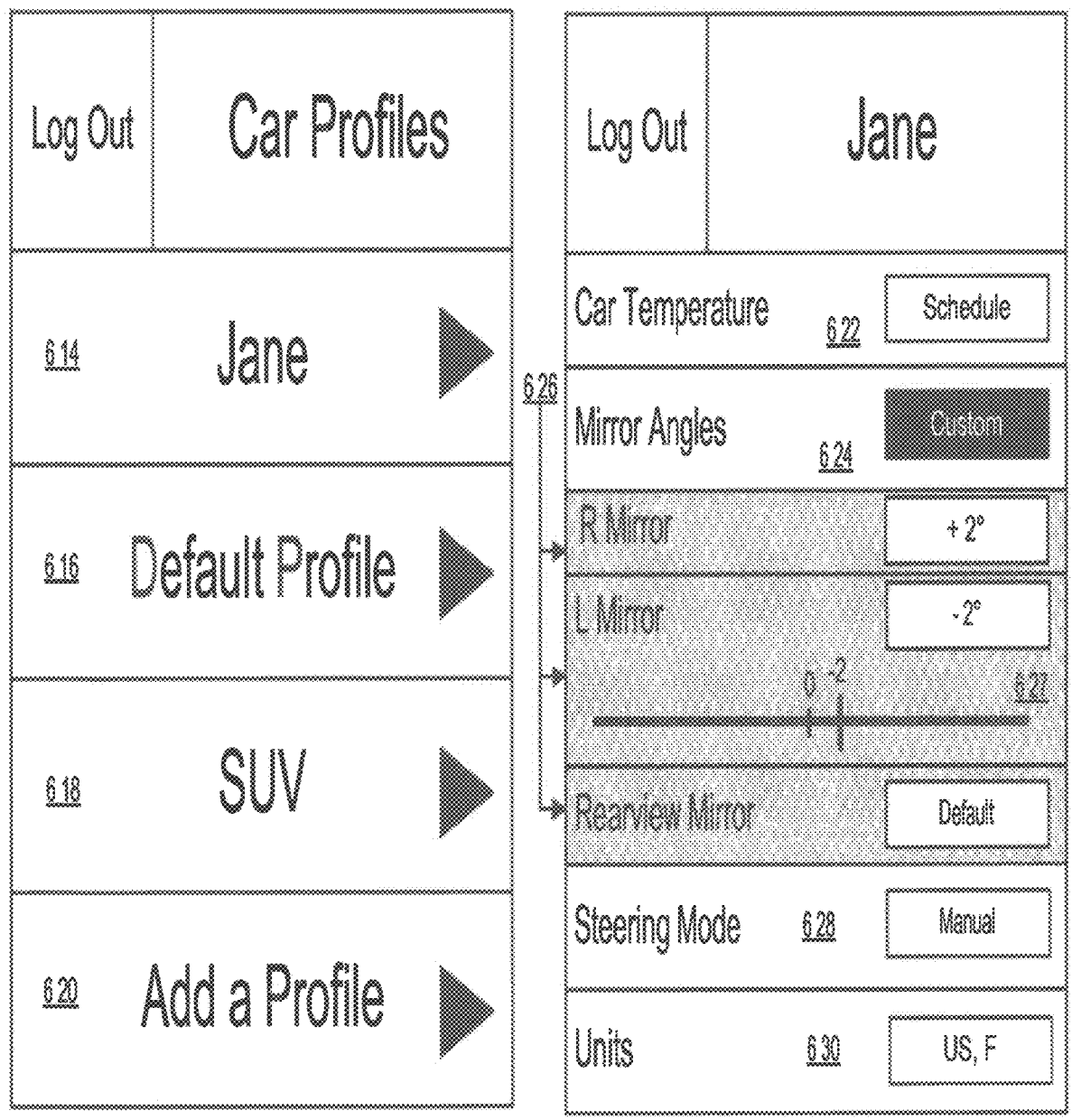
Figure 6B:
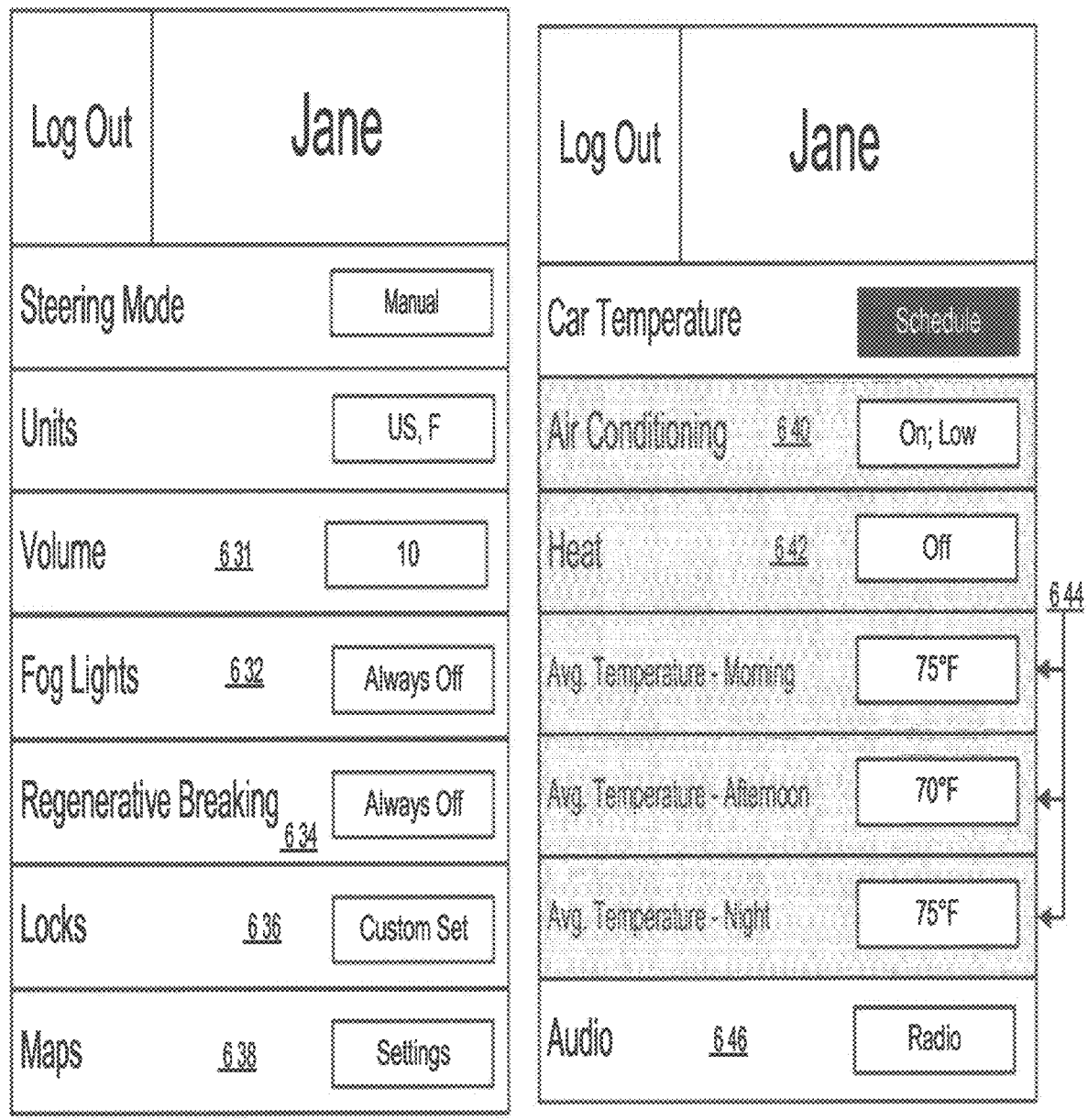

FIGS. 6a-c show block diagrams illustrating some embodiments of the AMIP. In some implementations, the user may be able to keep an assortment of automobile profiles for a variety of purposes. For example, the "Car Profiles" menu in the automobile interface may include a profile for the user 614 (e.g., Jane), downloaded from the AMIP server. The automobile interface automobile may also have a default 616 profile, persisted locally on the automobile or provided to and downloaded from the user's AMIP account. The user may also create profiles specific to a particular automobile(s) 618 (e.g., as identified by the car's VIN number, type, etc.), which may be used when the profile is loaded onto an automobile that matches the profile's use criteria. The user's profiles may be loaded onto any automobile supporting the AMIP system, thus allowing the user to easily transfer her preferred settings to, e.g., a rental or new automobile. Through the automobile interface, the user may be able to add 620 a new profile to her set of existing automobile profiles, which in turn may be uploaded onto the AMIP server.

In some implementations, the user may be able to control and/or save a variety of automobile settings, such as the desired passenger compartment temperature 622 of the automobile, mirror angles 624, steering modes 628 (e.g., automatic, manual), units of measurement used on displays and/or the like 630. In some implementations, the user may select a setting and cause additional setting options to appear. For example, if the user selects Mirror Angles 624, additional mirror-related setting options 626 may appear, such as the angle/position of the right mirror, left mirror, and rearview mirror. In some implementations, the user may type in the numerical values. In other implementations, the user may use a scroll bar 627 to specify the desired numerical value.

FIG. 6b shows additional exemplary automobile settings that may be configured. For example, user Jane's profile may specify a desired media volume 631, fog light settings 632, regenerative breaking 634, lock settings 636, map settings 638, the default audio source 646, etc. In some implementations, the car temperature setting may include additional configuration options. For example, the user may specify her desired air conditioning settings 640, heat settings 642, average temperatures 644 during the day (e.g., during morning, afternoon, and evening), and/or the like.

FIG. 6c shows additional exemplary automobile settings that may be configured. For example, user Jane's profile may specify a desired range mode 648. She may also specify desired lock settings, such as whether to enable auto-locking when the automobile starts 650 and when the user moves away from the automobile 652 (e.g., based on wireless signal strength or GPS location, etc.), whether to enable child protection locks 654, and/or the like. The user profile may also specify whether to enable automatic preset handles 656, automatic headlight control 658 (e.g., automatically turn off headlines after the driver exits the automobile), remote access for mobile applications 660, and/or the like. Additionally, the user profile may specify the user's preferred seat position 662 and temperature 664, automobile suspension 666 and engine 668 settings, and/or the like. In some implementations, suspension and engine settings may have a plurality of options (e.g. eco, weather, sport, race, and normal settings, and/or the like), which may be chosen based on road conditions and/or the like. For example, a user may choose "weather" settings in circumstances where it is raining or snowing heavily, and/or the like. In some implementations, based on the location (e.g. GPS coordinates, zip code, city, and/or the like) of the automobile and known road and/or weather conditions at that location, the automobile may automatically change or suggest changes to the automobile settings. For example, the automobile may switch to a weather engine setting if it determines that it is entering an area with poor weather conditions, or it may turn on fog lights if the user is about to drive into heavy fog, etc. In some implementations the user may also be able to indicate whether auto-adjustment 670 of mirrors should be enabled.

FIGS. 7a-c show block diagrams illustrating some embodiments of the AMIP. In some implementations, a user may be able to view a map 702 of the area surrounding her automobile. In some implementations, the user may be able to view the automobile's position 704 in relation to nearby merchants, financial institutions, and/or the like 706. The map may display information about each merchant and/or the like, such as the name 708 of the merchant, the address of the merchant, an estimated amount of time it would take to reach the merchant, and/or the like. In some implementations a user may also have options for interacting with the displayed merchant. For example, the user may request the map to display directions 710 to a selected merchant. As another example, some merchants may support online or over-the-phone order placements. In some implementations, merchants may register with the AMIP service to enable the order placement feature. For example, the merchant may specify to the AMIP server (e.g., via a web-based user interface) the available products, prices, means for transmitting orders (e.g., via email, SMS messages, HTTP, API call, etc.), etc. If a merchant enabled the order placement feature, a "Place Order" button 712 (or any other type of user interfaces) may be displayed on the map 702, for example. When a user wishes to place an order with the merchant (e.g. a take-out or pick-up order, and/or the like), he may, for example, click/tap on the user interface and be shown a product and price list. In some other implementations, pressing on the "Place Order" button 712 may cause the user's phone to dial a phone number associated with the merchant, thus allowing the user to place an order over the phone. Merchant phone numbers may be registered with the AMIP server by merchants, or they may be automatically determined by the AMIP server (e.g., by using conventional web crawling methods known to a person of ordinary skill in the art).

In some implementations, the map 702 may display specific products and/or services 714. The displayed products/services may reflect those on the user's shopping and/or wish list that have been found to be offered by a merchant on the map. In some implementations, the automobile interface (or the AMIP server) may identify a product (e.g., potato chips) listed on the user's shopping list, determine its general product category(ies) (e.g., food or snacks) or type of merchant that may offer it (e.g., supermarket, drug store, etc.), and search for merchants within the displayed map that offer the product or product category (e.g., by querying the product lists registered with the AMIP server or query the merchant's information server) or that belongs to the determined merchant type. Base on the search results, the map 702 may display a visual cue showing that a merchant at a particular location may offer the product/service on the user's shopping/wish list. In addition, information about the merchant (e.g., name and address) and/or the product (e.g., brand, price, location within the merchant store) may also be displayed. Such information may, for example, be registered by the merchant with the AMIP server. In some implementations, if multiple users are connected to the automobile user interface, the products/services displayed may be from any of their shopping/wish lists. In some implementations, visual cues may distinguish items/services from one user's shopping/wish list from another user's (e.g., by using different color codes or message box shape). In some implementations, the products/services shown may also be advertisements. For example, a merchant may register with the AMIP server to run an advertisement campaign. A user's automobile interface may display the advertisement on the map 702 when the automobile is sufficiently close to a merchant's location. The advertisement may be untargeted or targeted (e.g., based on information found in the user profile, such as gender, age, shopping list, etc.).

The map 702 may also be able to display routes to various merchants via route overlays on the map. For example, the map may show a direct route to a particular merchant 705, a route that would take the user to multiple merchants selected by the user 707, and/or the like. The user may also be able to access map settings 716, including specifying the location displayed by the map 718 (e.g. the current GPS location of the automobile, a particular zip code, city, state, highway, and/or the like, and/or any other inputted location). The user may also enable or disable the displaying of merchants 720 and products from the user's shopping and/or wish lists 722, and may be able to change color themes 724 for various merchant types shown on the map, in order to enable faster identification of markers on the map. In some implementations a joint shopping list created from all the wallet accounts connected with the automobile may automatically be generated when the wallet accounts are synced with the automobile. In some implementations, the automobile may use the joint shopping list to generate a route to items on several wallet user's shopping lists. For example, if Jane has potato chips and soda on her shopping list, and Kendra has orange juice and salad on hers, the joint shopping list on the automobile may display potato chips, soda, orange juice, and salad, and the automobile may show all of the items on its generated map (e.g., for when generating a map to obtain all of the items on the joint shopping list) when they are found.

Referring to FIGS. 7b-c, in some implementations, a user may be able to place an order 728 at a merchant using payment information from her wallet account. In some implementations, the user may be able to view all the wallet accounts 726 connected to the automobile interface. The order 728 being placed may be apportioned between several user wallet accounts 726. In some implementations, the representation of a user's wallet account may be dragged onto a particular item being ordered to indicate that the payment for that item is to be charged to the selected wallet account. A summary of the payment apportionment may be visually displayed, such as in the manner shown in 730. For example, FIG. 7b shows that Jane's Wallet will be used to pay for item 2 and 3 (i.e., the 1 Large Soda and 1 Salad) 730, Kendra's Wallet will be used to pay for item 1 (i.e., the 1 Hamburger), and Laura's Wallet will not be used to pay for anything. In some implementations, apportionment of the bill may be based on a specified proportion of the bill 732, rather than based on specific item costs. In some implementations, the proportions may be specified via interacting with sliding and/or like controls 734, which allow each user to choose how much of the bill he or she would like to cover. As shown in the example, Jane's Wallet will cover slightly more than half of the bill, Kendra's Wallet will cover the rest, and Laura's Wallet will not cover any portion of the bill. A summary of the proportions may be displayed 732.

In some implementations, the user may be able to view this information on a merchant's order interface 736, on the automobile's display 740, or on the user's mobile device 738. In some implementations, AMIP may provide secondary device authentication. For example, the information may be displayed on a merchant's order interface or the automobile's display, but after a user chooses to complete the order, a message may be sent to the user's electronic device (and/or to any other users who have contributed to the bill) asking for further confirmation of the order, authentication input (e.g. a passcode, a biometric confirmation, and/or the like), and/or the like, before the order is successfully processed. In some implementations the secondary device authentication may be sent directly to the merchant and/or order machine, or out of band. In some implementations, the information for the merchant may be passed on to the user via store injection, VNC, and/or the like.

Figure 8A:
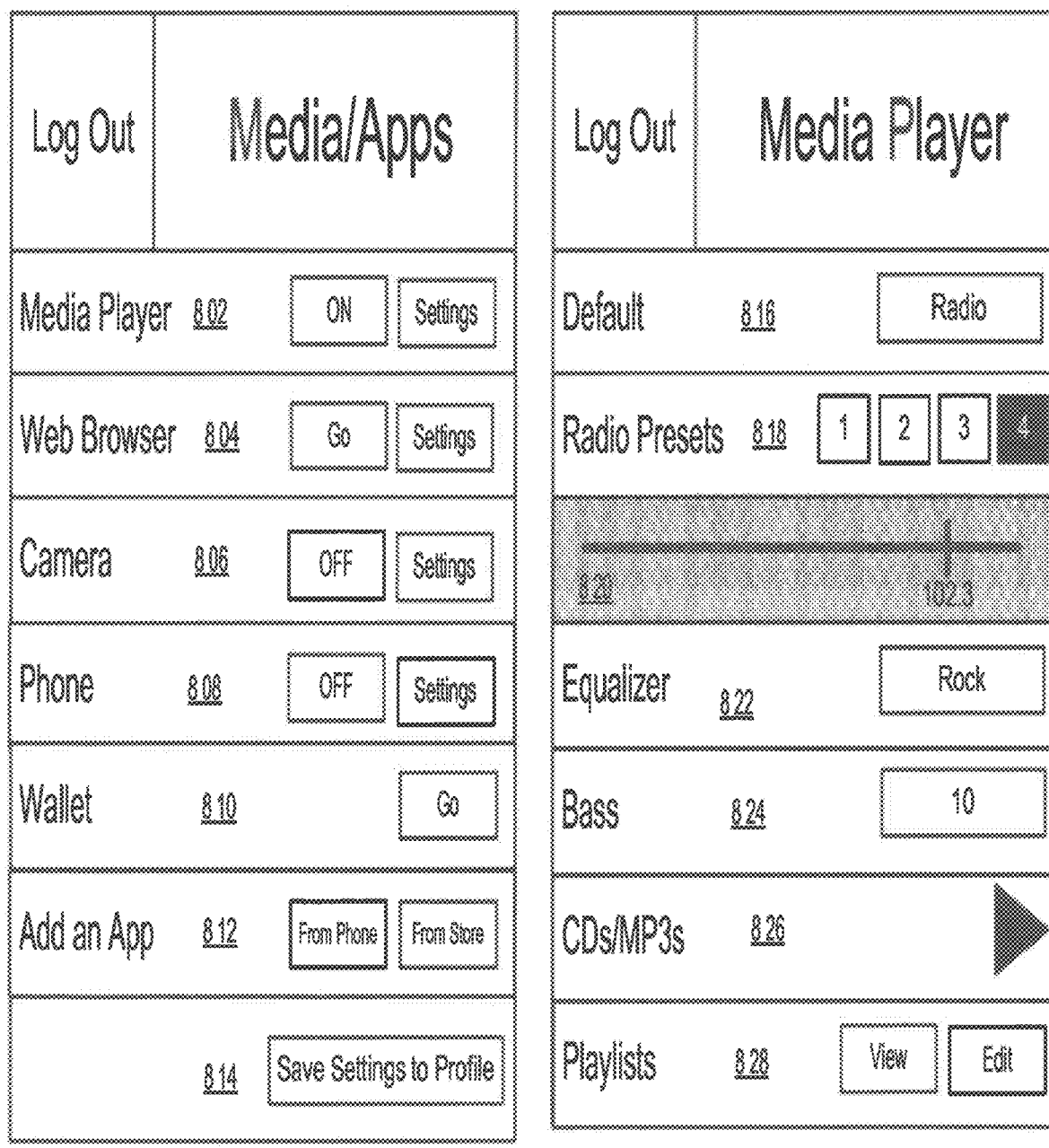
Figure 8B:
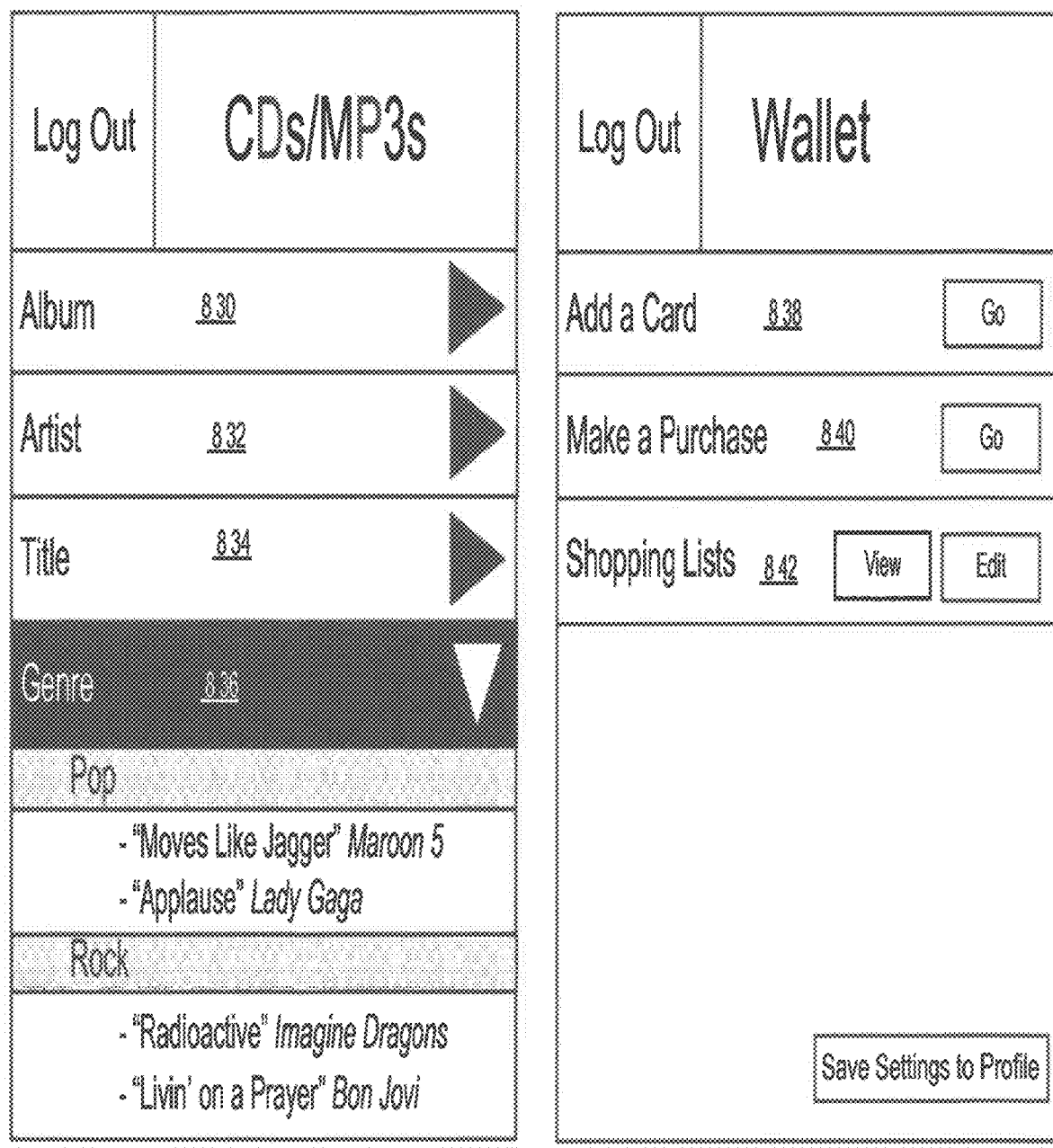

FIGS. 8a-b show block diagrams illustrating some embodiments of the AMIP. In some implementations, the user may be able to use a variety of applications, such as a media player 802, a web browser 804, a camera application 806, a phone application 808, a wallet application 810, and/or the like. In some implementations a user may also be able to add an application 812, which the user may launch virtually from her phone applications, may purchase and/or obtain from an application store, and/or the like. In some implementations, each application may have settings that, when configured, may automatically be saved via enabling a save settings to profile feature 814. In some implementations, the camera and phone applications may be integrated with a user's mobile device and/or the like.

In some implementations, the media player may have a plurality of customizable settings, such as the default source of audio 816 (e.g. the radio, a CD/DVD player, an MP3 player, a media application, and/or the like). In some implementations the user may be able to choose radio presets 818 via a bar selector and/or like selector 820. The user may also be able to choose preset and/or generate custom equalizer settings 822, the bass level 824, and/or may be able to manage CDs or MP3 music 826 either stored in the automobile interface or stored via an MP3 and/or CD player connected to the automobile. The user may be able to sort through music via searching by album 830, artist 32, title 834, genre 836, and/or the like. In some implementations, the user may also be able to create playlists 828. In some implementations, the user may be able to edit properties of the playlist 846, e.g. the name of the playlist, the wallet users who may add and/or otherwise edit the playlist, and/or the like. In some implementations the automobile may automatically generate a playlist, combining the playlist(s) of each wallet account connected to the automobile into a joint playlist. The user may be able to view all the songs in a playlist, and may also be able to see the source 848 of the song (e.g. from a wallet account, from a CD and/or MP3 player, and/or the like). The user may also be able to see all the wallet accounts connected to the automobile and authorized to add songs to the playlist 850, and may be able to select and/or drag songs from any of these wallet accounts to the main playlist 852. In some implementations this may be done via the automobile display interface. In other implementations, the users may each be able to add songs to the main playlist via their individual electronic devices. In some implementations, the digital music may be played or streamed through a user's device. In some implementations, similar interfaces may be employed for other collaborative products (e.g. an order, a shopping list, and/or the like).

In some implementations, the user may interact with the wallet application to perform a variety of tasks. For example, the user may be able to add purchase methods 838 to her wallet account, may be able to make purchases 840 from the wallet application (e.g., via merchants, products and/or the like stored in the user's profile, via merchant searches in the wallet application, and/or the like), and may be able to view and/or edit shopping lists 842 and/or the like. Changes made through the automobile interface may be saved to the user's AMIP server account.

Figure 9A:
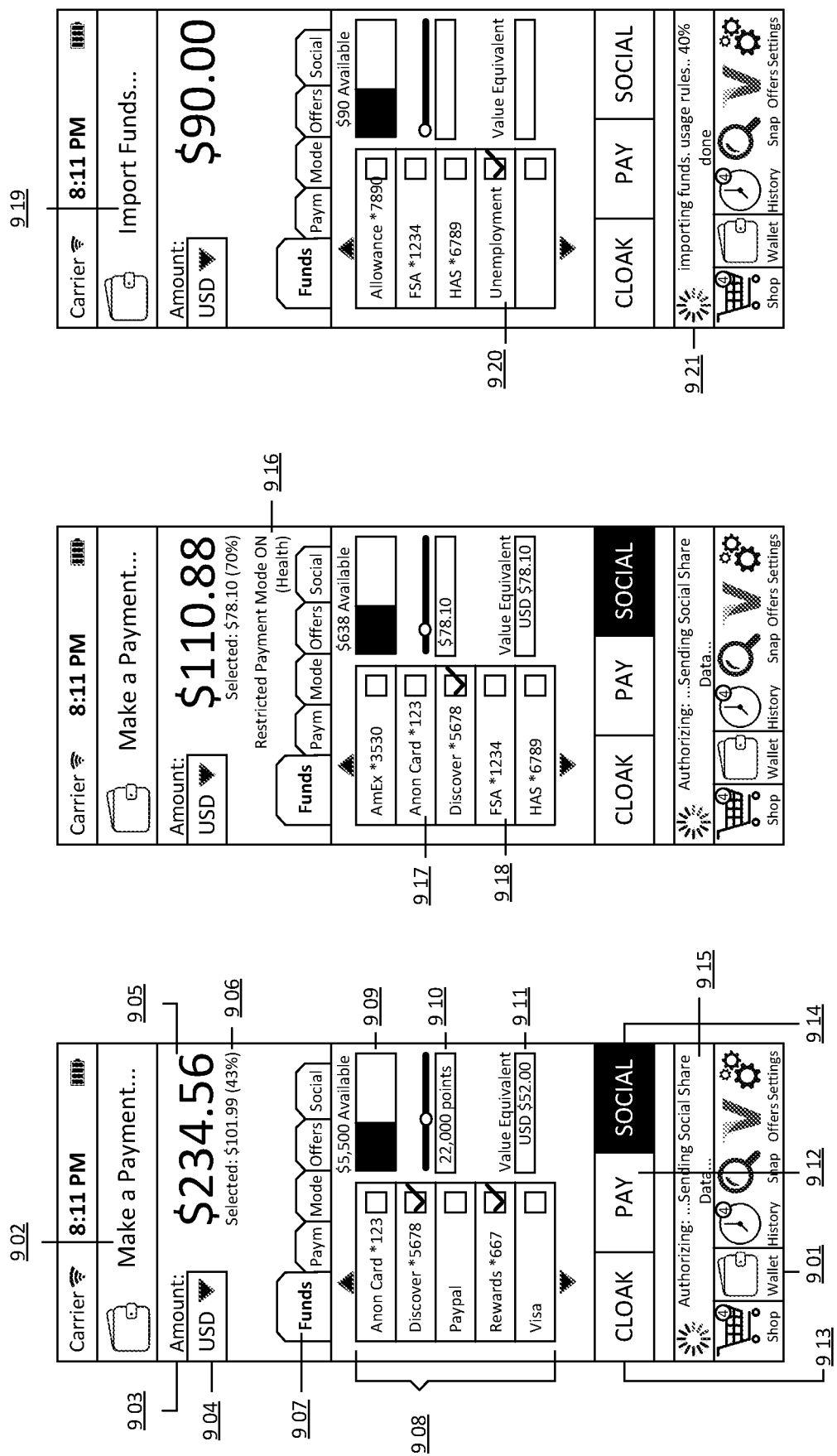
Figure 9B:
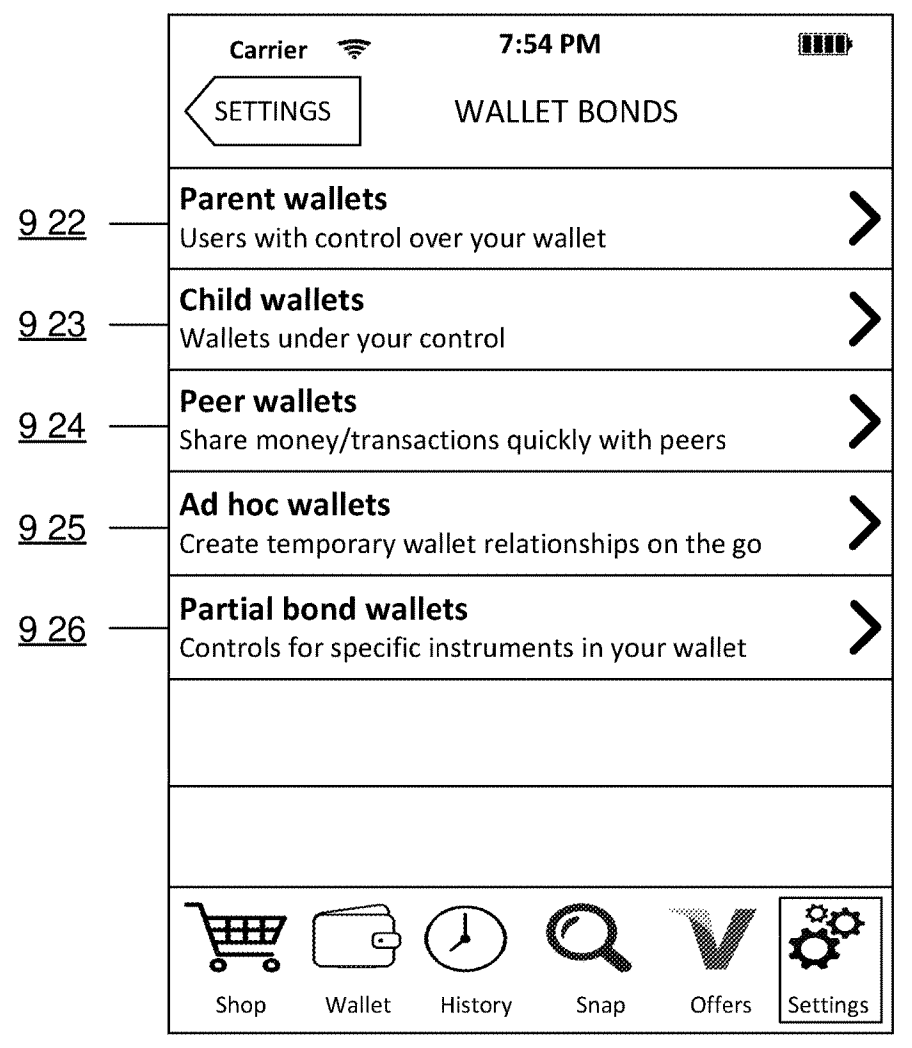

FIGS. 9*a-b* show further embodiments of the electronic wallet application within the automobile interface. In some implementations, the wallet application may provide a user with a number of options for paying for a transaction via the wallet mode 901. In one implementation, an example user interface 902 for making a payment is shown. The user interface may clearly identify the amount 903 and the currency 904 for the transaction. The amount may be the amount payable and the currency may include real currencies such as dollar and euro, as well as virtual currencies such as reward points. The amount of the transaction 905 may also be prominently displayed on the user interface. The user may select the funds tab 907 to select one or more forms of payment 908, which may include various credit, debit, gift, rewards and/or prepaid cards. The user may also have the option of paying, wholly or in part, with reward points. For example, the graphical indicator 909 on the user interface shows the number of points available, the graphical indicator 910 shows the number of points to be used towards the amount due 234.56 and the equivalent 911 of the number of points in a selected currency (USD, for example).

In one implementation, the user may combine funds from multiple sources to pay for the transaction. The amount 906 displayed on the user interface may provide an indication of the amount of total funds covered so far by the selected forms of payment (e.g., Discover card and rewards points). The user may choose another form of payment or adjust the amount to be debited from one or more forms of payment until the amount 906 matches the amount payable 905. Once the amounts to be debited from one or more forms of payment are finalized by the user, payment authorization may begin.

In one implementation, the user may select a secure authorization of the transaction by selecting the cloak button 913 to effectively cloak or anonymize some (e.g., pre-configured) or all identifying information such that when the user selects pay button 912, the transaction authorization is conducted in a secure and anonymous manner. In another implementation, the user may select the pay button 912, which may use standard authorization techniques for transaction processing. In yet another implementation, when the user selects the social button 914, a message regarding the transaction may be communicated to one of more social networks (set up by the user) which may post or announce the purchase transaction in a social forum such as a wall post or a tweet. In one implementation, the user may select a social payment processing option 914. The indicator 915 may show the authorizing and sending social share data in progress.

In another implementation, a restricted payment mode 916 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 917 under the funds tab to select specialized accounts such as a flexible spending account (FSA) 918, health savings account (HAS), and/or the like and amounts to be debited to the selected accounts. In one implementation, such restricted payment mode 916 processing may disable social sharing of purchase information.

In one embodiment, the wallet application may facilitate importing of funds via the import funds user interface 919. For example, a user who is unemployed may obtain unemployment benefit fund 920 via the wallet application. In one implementation, the entity providing the funds may also configure rules for using the fund as shown by the processing indicator message 921. The wallet may read and apply the rules prior, and may reject any purchases with the unemployment funds that fail to meet the criteria set by the rules. Example criteria may include, for example, merchant category code (MCC), time of transaction, location of transaction, and/or the like.

Referring to FIG. 9*b*, in some implementations a user may be able to modify settings such as, but not limited to, settings regarding: parent wallets 922 (e.g., those that have authorization to place restriction on the user's wallet); child wallets 923 (e.g., those wallets over which the user has authorization to place restrictions); peer wallets 924 (e.g., those wallets that have a similar level of control and transparency); ad hoc wallets 925 (e.g., those wallets that are connected temporarily in real-time, for example, for a one-time funds transfer); partial bond wallets 926 (e.g., such as bonds between corporate employer virtual wallet and an employee's personal wallet, such that an employer wallet may provide limited funds with strings attached for the employee wallet to utilize for business purposes only), and/or the like. In some implementations, a bond between an automobile profile and a wallet profile may also be formed.

Figure 10A:
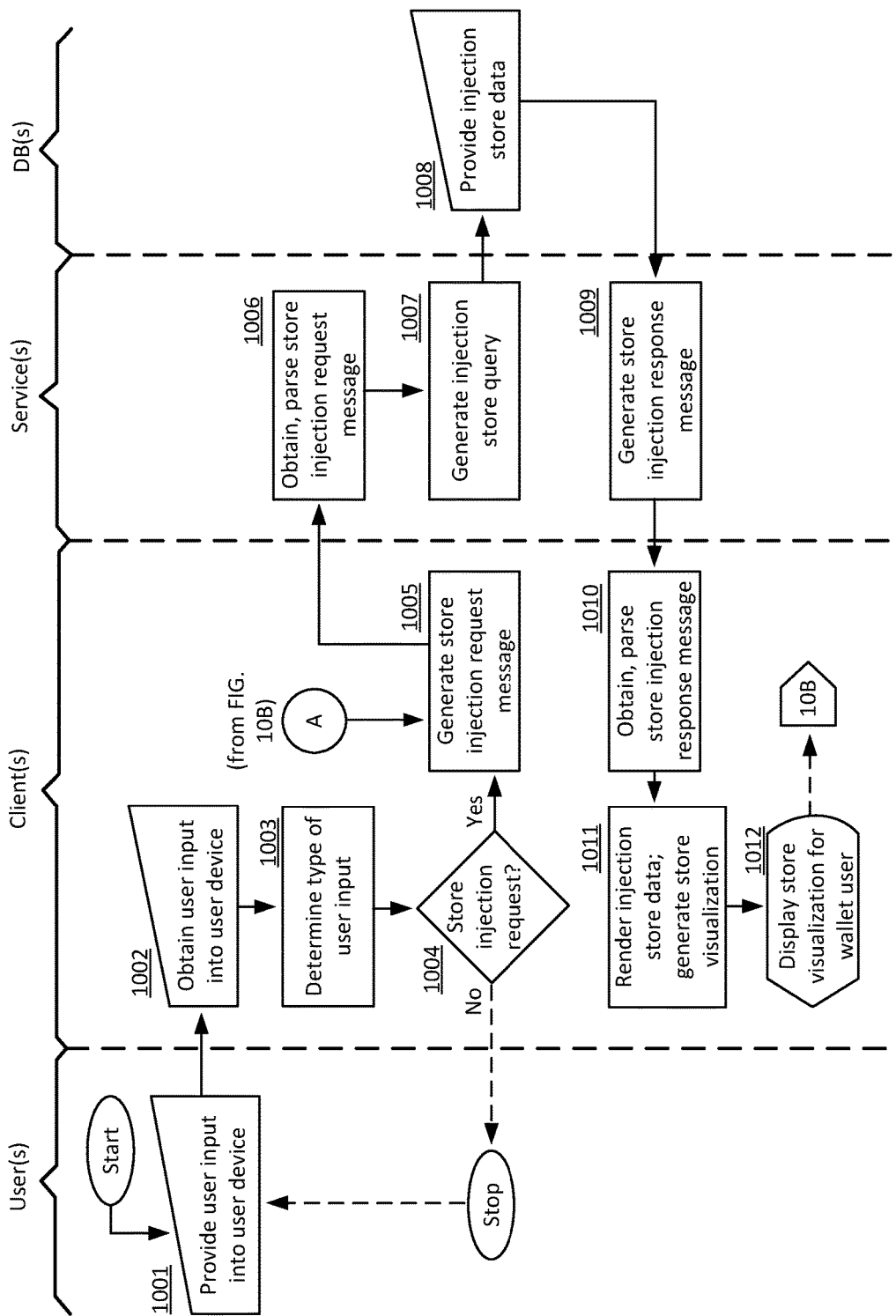
FIGS. 10a-b show block diagrams illustrating example store injection embodiments of the AMIP.
Figure 10B:
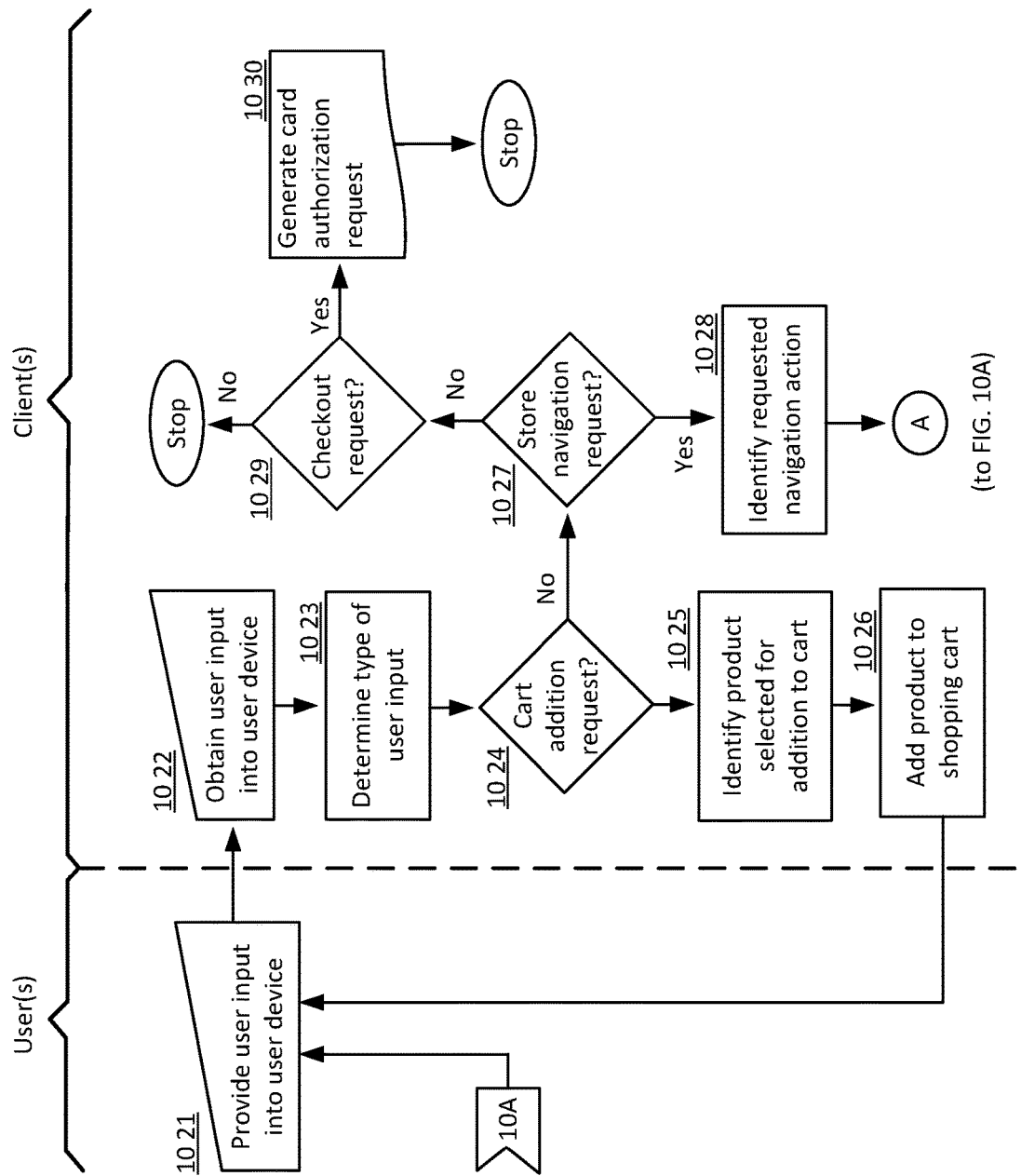

Referring to FIGS. 10*a-b*, in some embodiments, a user may provide a user input 1001 into a device executing a virtual wallet application (e.g., an automobile interface). The device ("client") may obtain the user input, e.g., 1002. In various implementations, the user input may include, but not be limited to: keyboard entry, card swipe, activating a RFID/NFC enabled hardware device (e.g., electronic card having multiple accounts, smart phone, tablet, etc.), mouse clicks, depressing buttons on a joystick/game console, voice commands, single/multi-touch gestures on a touch-sensitive interface, touching user interface elements on a touch-sensitive display, and/or the like. The client may determine the type of user input, e.g., 1003. For example, the client may determine whether the user input corresponds to a request for a merchant store to be injected into the virtual wallet application. If the user input constitutes a store injection request, e.g., 1004 option "Yes," the client may generate a store injection request message, e.g., 1005. For example, the client may provide a store injection request message to a server as a HTTP(S) POST message including XML-formatted data. An example listing of a store injection request message, substantially in the form of a HTTP(S) POST message including XML-formatted data, is provided below:

```
POST /storeinjectionrequest.php HTTP/1.1
Host: www.merchant.com
Content-Type: Application/XML
Content-Length: 453
<?XML version = "1.0" encoding = "UTF-8"?>
<store_injection_request>
    <session_ID>ANAv483</session_ID>
    <timestamp>2052-01-01 12:12:12</timestamp>
    <user_id>john.q.public</user_id>
    <injection_data_request>
        <type>NEW STORE REQUEST</type>
        <merchant_id>JKHVHCGV456</merchant_id>
        <store_id>1234</store_id>
        <injection_point>ENTRY</injection_point>
    <augmented_reality_flag>ON</augmented_reality_flag>
        <view_type>street view</view_type>
        <alt_view_type>map view</alt_view_type>
    </injection_data_request>
```

In some embodiments, the server may obtain the store injection request from the client, and may parse the message, e.g., 1006. For example, the server may utilize a parser. The server may extract the request parameters from the client's message and generate a query for the requested store injection data, e.g., 1007. Examples of store injection data include, without limitation: product information, product images, product animations, videos, media content, animations, store wireframes, street view data, map data, lists of products (e.g., XML data), advertisements, URLs pointing to other store injection data, augmented reality data, executable script (e.g., JavaScript™, Adobe Flash® object, bundle files, HTML5 code, etc.), and/or the like. For example, the server may issue PHP/SQL commands to query a database table for store injection data. An example store injection data query command, substantially in the form of PHP/SQL commands, is provided below:

```
<?PHP
header ('Content-Type: text/plain');
mysql_connect("254.93.179.112",$DBserver,$password); //
access database server
mysql_select_db("AMIP_DB.SQL"); // select database table to
search
//create query
$query = "SELECT product_information, product_images,
product_animations, videos, media_content, animations,
store_wireframes, street_view_data, map_data, product_list,
pointer_URL_list, augmented_reality_data,
executable_script_list FROM ShopSessionTable WHERE
session_id LIKE '%' $sessionid";
$result = mysql_query($query); // perform the search query
mysql_close("AMIP_DB.SQL"); // close database access
?>
```

In some embodiments, in response to the query, a database management system may provide the data requested by the server, e.g., 1008. Using the obtained data, the server may generate a store injection response message, e.g., 1009. For example, the server may provide a store injection response message to the client as a HTTP(S) POST message including XML-formatted data. An example listing of a store injection response message, substantially in the form of a HTTP(S) POST message including XML-formatted data, is provided below:

```
POST /storeinjectionresponse.php HTTP/1.1
Host: www.client.com
Content-Type: Application/XML
Content-Length: 1777
<?XML version = "1.0" encoding = "UTF-8"?>
<store_injection_response>
    <session_ID>ANAv483</session_ID>
    <timestamp>2052-01-01 12:12:15</timestamp>
    <user_id>john.q.public</user id>
    <merchant_id>JKHVHCGV456</merchant_id>
    <store_id>1234</store_id>
    <injection_point>ENTRY</injection_point>
    <augmented_reality_flag>ON</augmented_reality_flag>
    <view_type>street view</view_type>
    <alt_view_type>map view</alt_view_type>
    <inventory_data>
        <categories>
            <books>
                ...
                <product_params>
                    <product_type>Self Help</product_type>
                    <product_title>XML for dummies</product_title>
                    <ISBN>938-2-14-168710-0</ISBN>
                    <edition>2nd ed.</edition>
                    <cover>hardbound</cover>
                    <price>$59</price>
                    <inventory>70</ inventory>
                </product_params>
                ...
            </books>
            ...
            <electronics>
                <vendors>
                ...
                <Apple>
                    ...
                    <product_params>
                        <product_type>tablet</product_type>
                        <product_name>iPad</product_name>.
                        <serialno>12345678</ serialno >
                        <modelnb>12345</modelno>
                        <description>64GB, 4G</description>
                        <price>$829</price>
                        <inventory>7</ inventory>
                    </product_params>
                    ...
                </Apple>
                ...
            </electronics>
        </categories>
        <products>
            ...
            <product_params>
                <publisher_params>
        <publisher_id>54TBRELF8</publisher_id>
                    <publisher_name>McGraw-Hill, Inc.</publisher_name>
                </publisher_param>
                <product_type>book</product_type>
                <product_params>
                <product_title>XML for dummies</product_title>
                    <ISBN>938-2-14-168710-0</ISBN>
                    <edition>2nd ed.</edition>
                    <cover>hardbound</cover>
                </product_params>
                <inventory_level>2</inventory_level>
                <unit cost>$14.46</unit_cost>
                <coupon_id>AY34567</coupon_id>
            </product_params>
            ...
            <product_params>
                <product_id>HJKFG345</product_id>
                <product_name>Philips Sonicare</product_name>
                <vendor_name>Philips,
```

-continued

```
Inc.</vendor name>
    <model<EH57</model>
  <product_type>Toothbrush</product_type>
    <inventory_level>12</inventory_level>
    <unitcost>$34.78</unit_cost>
    <coupon_id>null</coupon_id>
  </product_params>
  ...
  </products>
...
</inventory_data>
<store_injection_enhanced_interface_data>
  <floorplan_URL>www.inject.com?id=
ANAv483&type=img</floorplan_URL>
  <UI_script _URL>www.inject.com?id=
ANAv483&type=script</UI_script_URL>
  <ShopAssistant_UIbundle_url>www.inject.com?id=
ANAv483&type=bundle</ShopAssistant_UIbundle_url>
  <AugmentedRealityFloorplanCartPinOverlayUI_html5_url
>www.inject.com?id=
ANAv483&type=html5</AugmentedRealityFloorplanCartPinOverlay
UI _html_url>
  <InteractiveStore_flash_url>www.inject.com?id=
ANAv483.&type=flash</interactiveStore_flash_url>
  </store_injection_enhanced_interface_data>
</store_injection_response>
```

In some embodiments, the client may obtain the store injection response message, and parse the message, e.g., 1010. The client may render a visualization of the virtual store using the extracted store injection data, e.g., 611, and display the rendered visualization for the user via a display device of the client, e.g., 1012.

The user may provide a user input into the virtual store visualization generated by the client, e.g, 1021. The client may obtain the user input, e.g., 1022, and may determine its input type, e.g., 1023. If the user input represents a cart addition request, e.g., 1024 option "Yes," the client may identify a product that the user desires to add to a shopping cart, e.g., 1025, and may add the user-selected product to a virtual shopping cart or wishlist, e.g., 1026. The user may then continue to provide other inputs 1021. If the user input represents a store navigation request (e.g., walking through the aisle within a virtual store), e.g., 1027 option "Yes," the client may identify the store navigation action requested by the user, e.g., 1028, and may generate a store injection request message to obtain store injections from the server (see, e.g., 1005-1012). If the user input represents a checkout request, e.g., 1029 option "Yes," the client may generate a card authorization request, e.g., 1030, as a trigger for a purchase transaction. In some implementations, a checkout screen such as the example shown in FIG. 7b may be displayed. Once the user finalizes her preferences, the client may provide a card authorization request to a purchase transaction authorization component.

AMIP Controller

Figure 11:
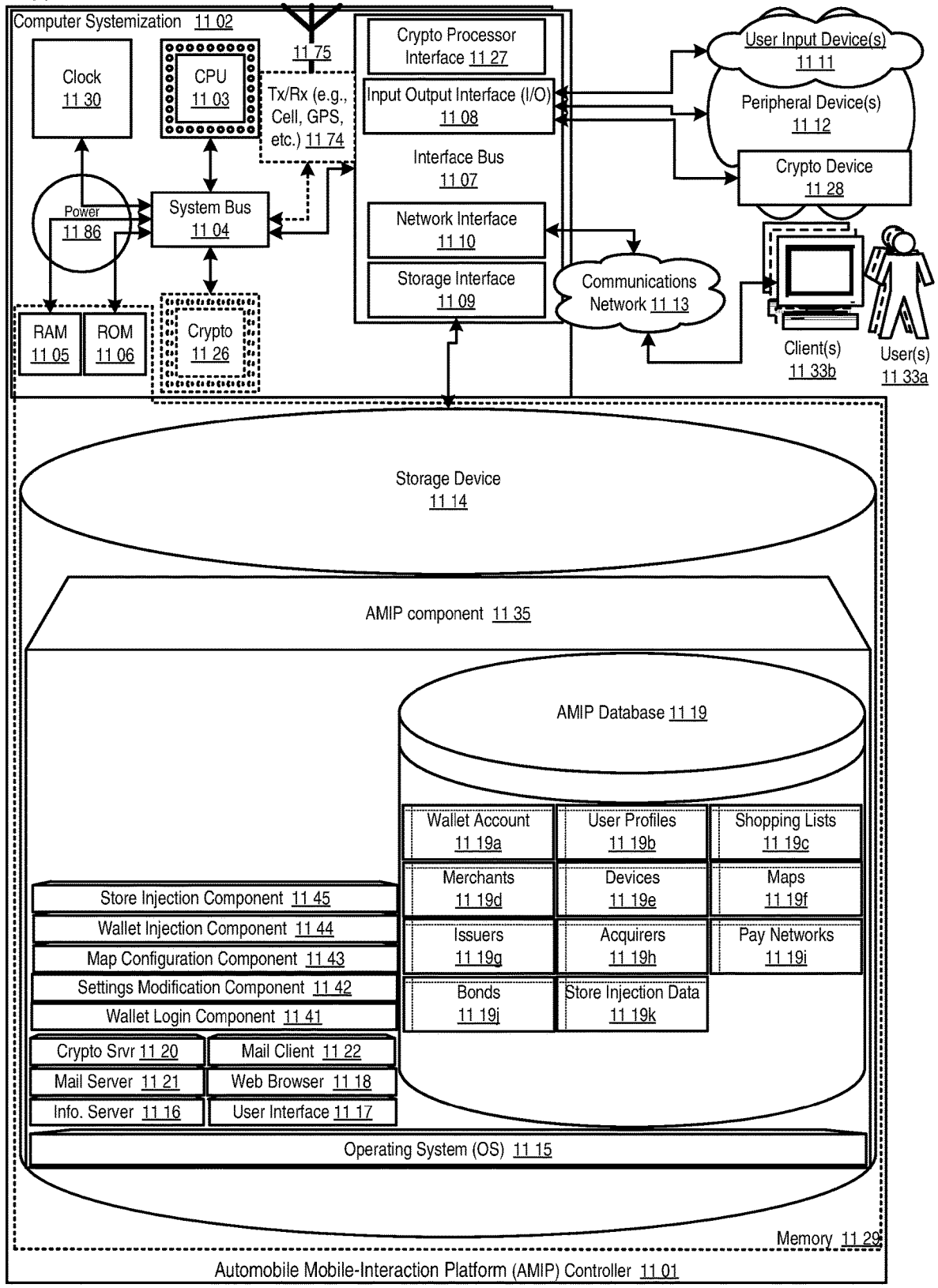
FIG. 11 shows a block diagram illustrating embodiments of an AMIP controller.

FIG. 11 shows a block diagram illustrating embodiments of a AMIP controller. In this embodiment, the AMIP controller 1101 may serve to aggregate, process, store, search, serve, identify, instruct, generate, match, and/or facilitate interactions with a computer through NFC and virtual wallet technologies, and/or other related data.

Typically, users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the AMIP controller 1101 may be connected to and/or communicate with entities such as, but not limited to: one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The AMIP controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186; e.g., optionally the power source may be internal. Optionally, a cryptographic processor 1126 and/or transceivers (e.g., ICs) 1174 may be connected to the system bus. In another embodiment, the cryptographic processor and/or transceivers may be connected as either internal and/or external peripheral devices 1112 via the interface bus I/O. In turn, the transceivers may be connected to antenna(s) 1175, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing AMIP controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the AMIP controller and beyond through various interfaces. Should processing requirements dictate a greater amount speed and/or capacity, distributed processors (e.g., Distributed AMIP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the AMIP may be achieved by implementing a microcontroller such as CAST's R8051XC2 microcontroller; Intel's MCS 51 (i.e., 8051 microcontroller); and/or the like. Also, to implement certain features of the AMIP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the AMIP component collection (distributed or otherwise) and/or features may be implemented via the microprocessor and/or via embedded components; e.g., via ASIC, coprocessor, DSP, FPGA, and/or the like. Alternately, some implementations of the AMIP may be implemented with embedded components that are configured and used to achieve a variety of features or signal processing.

Depending on the particular implementation, the embedded components may include software solutions, hardware solutions, and/or some combination of both hardware/software solutions. For example, AMIP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the AMIP features. A hierarchy of programmable interconnects allow logic blocks to be interconnected as needed by the AMIP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the AMIP may be developed on regular FPGAs and then migrated into a fixed version that more resembles ASIC implementations. Alternate or coordinating implementations may migrate AMIP controller features to a final ASIC instead of or in addition to FPGAs. Depending on the implementation all of the aforementioned embedded components and microprocessors may be considered the "CPU" and/or "processor" for the AMIP.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the AMIP thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the AMIP controller is accessible through remote clients 1133*b* (e.g., computers with web browsers) by users 1133*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed AMIP), architectures may similarly be employed to pool, load balance, and/or otherwise increase the communicative bandwidth required by the AMIP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the AMIP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the AMIP controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the AMIP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the AMIP controller and/or a computer systemization may employ various forms of memory 1129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1129 will include ROM 1106, RAM 1105, and a storage device 1114. A storage device 1114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the AMIP component(s) 1135, including components 641-642; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the AMIP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the AMIP controller to communicate with other entities through a communications network 1113. Various communication protocols may be used by the AMIP controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the AMIP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the AMIP database 1119, operating systems, other program components, user interfaces, Web browsers, and/or the like.

Access to the AMIP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the AMIP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the AMIP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the AMIP enabled nodes. The combined application may be nugatory on systems employing standard Web browsers.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the AMIP.

Access to the AMIP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the AMIP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the AMIP component to engage in secure transactions if so desired. The cryptographic component facilitates the secure accessing of resources on the AMIP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The AMIP Database

The AMIP database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the AMIP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the AMIP database is implemented as a data-structure, the use of the AMIP database 1119 may be integrated into another component such as the AMIP component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-k*. A wallet account table 1119*a* includes fields such as, but not limited to: wallet_ID, wallet_user_name, wallet_user_password, wallet_user_f-name, wallet_user_lname, wallet_user_address, wallet_devices, wallet_user_email, wallet_date_added, wallet_uprofile, wallet_shopping_list, and/or the like. The wallet account table may support and/or track multiple user wallet accounts on a AMIP. A user profile table 1119*b* includes fields such as, but not limited to: uprofile_ID, uprofile_name, uprofile_settings, uprofile_date_added, uprofile_map, uprofile_media, and/or the like. The actions table may support and/or track multiple user profiles on a AMIP. A shopping list table 1119*c* includes fields such as, but not limited to: shopping_list_ID, shopping_list_name, shopping_list_products, shopping_list_date_created, and/or the like. The shopping list table may support and/or track multiple shopping lists on a AMIP. A merchant account table 1119*d* includes fields such as, but not limited to: merchant_ID, merchant_store_injection_package, merchant_address, merchant_name, merchant_email, merchant_products, merchant_date_added, merchant_order_processing_interface_address, and/or the like. The merchant account table may support and/or track multiple merchant accounts on a AMIP. A device table 1119*e* includes fields such as, but not limited to: device_ID, device_user_ID, device_type, device_make, device_model, device_OS, device_name, and/or the like. The device table may support and/or track multiple user devices on a AMIP. A maps table 1119*f* includes fields such as, but not limited to: map_ID, map_location, map_show_merchant, map_show_shopping_list, map_theme, map_merchants, map_settings, and/or the like. The maps table may support and/or track map data on a AMIP. An issuers table 1119*g* includes fields such as, but not limited to: issuer_ID, issuer_name, issuer_address, issuer_certificates, and/or the like. The issuers table may support and/or track multiple issuer accounts on a AMIP. An acquirers table 1119*h* includes fields such as, but not limited to: acquirer_ID, acquirer_name, acquirer_address, acquirer_certificates, and/or the like. The acquirers table may support and/or track multiple acquirer accounts on a AMIP.

A payment networks table 1119*i* includes fields such as, but not limited to: pn_ID, pn_issuer_IDs, pn_acquirer_IDs, pn_merchant_IDs, pn_certificates, and/or the like. The payment networks table may support and/or track multiple payment networks on a AMIP. A bonds table 1119*j* includes fields such as, but not limited to: bond_ID, bond_entity_a, bond_entity_b, bond_type, bond_created, bond_settings, and/or the like. The bonds table may support and/or track multiple bonds relationships on a AMIP. A store injection data table 1119*k* includes fields such as, but not limited to: user_id, session_id, alerts_URL, timestamp, expiry_lapse, merchant_id, store_id, device_type, device_ID, device_IP, device_MAC, device_browser, device_serial, device_ECID, device_model, device_OS, wallet_app_installed, total_cost, cart_ID_list, product_params_list, social_flag, social_message, social_networks_list, coupon_lists, accounts_list, CVV2_lists, charge_ratio_list, charge_priority_list, value_exchange_symbols_list, bill_address, ship_address, cloak_flag, pay_mode, alerts_rules_list, and/or the like. The store injection data table may support and/or track multiple store injection packets on a AMIP.

In one embodiment, the AMIP database may interact with other database systems. For example, employing a distributed database system, queries and data access by search AMIP component may treat the combination of the AMIP database, an integrated data security layer database as a single database entity.

In one embodiment, user programs may contain various user interface primitives, which may serve to update the AMIP. Also, various accounts may require custom database tables depending upon the environments and the types of clients the AMIP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1119*a-k*. The AMIP may be configured to keep track of various settings, inputs, and parameters via database controllers.

The AMIP database may communicate to and/or with other components in a component collection, including itself, and/or facilities of the like. Most frequently, the AMIP database communicates with the AMIP component, other program components, and/or the like. The database may contain, retain, and provide information regarding other nodes and data.

The AMIPs

The AMIP component 1135 is a stored program component that is executed by a CPU. In one embodiment, the AMIP component incorporates any and/or all combinations of the aspects of the AMIP that was discussed in the previous figures. As such, the AMIP affects accessing, obtaining and the provision of information, services, transactions, and/or the like across various communications networks. The features and embodiments of the AMIP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the AMIP's features and facilities, and in many cases reduce the costs, energy consumption/requirements, and extend the life of AMIP's underlying infrastructure; this has the added benefit of making the AMIP more reliable. Similarly, many of the features and mechanisms are designed to be easier for users to use and access, thereby broadening the audience that may enjoy/employ and exploit the feature sets of the AMIP; such ease of use also helps to increase the reliability of the AMIP. In addition, the feature sets include heightened security as noted via the Cryptographic components 1120, 1126, 1128 and throughout, making access to the features and data more reliable and secure.

The AMIP transforms wallet and automobile inputs via AMIP's Wallet Login 1141, Settings Modification 1142, Map Configuration 1143, Wallet Injection 1144, and Store Injection 1145 components into transaction and automobile outputs.

The AMIP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the AMIP server employs a cryptographic server to encrypt and decrypt communications. The AMIP component may communicate to and/or with other components in a component collection, including itself, and/or facilities of the like. Most frequently, the AMIP component communicates with the AMIP database, operating systems, other program components, and/or the like. The AMIP may contain, communicate, generate, obtain, and/or provide program component, system, user, and/or data communications, requests, and/or responses.

Distributed AMIPs

The structure and/or operation of any of the AMIP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the AMIP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the AMIP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address = '192.168.0.100';
$port = 255;
// create a server-side SSL socket, listen for/accept
incoming communication
$sock = socket_create(AF_INET, SOCK _STREAM, 0);
socket_bind($sock, $address, $port) or die('Could not bind
to address');
socket_ listen($sock);
$client = socket_accept($sock);
// read input data from client device in 1024 byte blocks
until end of message
do {
   $input = "";
   $input = socket_read($client, 1024);
   $data .=$input;
} while ($input ! = "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a
CLIENT database
mysql_close("CLIENT_DB.SQL"); // close connection to
database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for AUTOMOBILE MOBILE-INTERACTION PLATFORM APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a AMIP individual and/or enterprise user, database configuration and/or relational model, data type, data transmission and/or network framework, syntax structure, and/or the like, various embodiments of the AMIP, may be implemented that enable a great deal of flexibility and customization. While various embodiments and discussions of the AMIP have included connecting an electronic wallet to a smart automobile interface, it is to be understood that the embodiments described herein may be readily configured and/or customized for a wide variety of other applications and/or implementations.

What is claimed is:

1. A computer-implemented method for personalizing an automobile, comprising:
   authenticating, by a remote computer system, a wallet credential from a wallet application executing at a mobile computing device;
   sending, by the remote computer system, a profile associated with the wallet credential to the automobile in response to the authenticating step, the profile including a shopping list corresponding to the wallet application, the shopping list associated with and edited by a user of the mobile computing device and including at least one entry specifying a product or service;
   determining, by the remote computer system, a merchant within a predetermined distance from a location of the automobile, the merchant having the product or service from the shopping list in response to a store inventory request from the automobile;
   receiving, by the remote computer system, a payment transaction request for the product or service from the automobile via the wallet application;
   sending, by the remote computer system and in response to the store inventory request and the payment transaction request:
      a plurality of payment methods to the automobile, the plurality of payment methods corresponding to the profile associated with the wallet credential,
      a store injection response that identifies the merchant within the predetermined distance from the location of the automobile, the merchant having the product or service from the shopping list,
      map data indicating a route from the location of the automobile to the merchant within the predetermined distance from the location of the automobile having the product or service from the shopping list, and
      computer-executable instructions to generate a visual map and navigation instructions at the automobile using the map data and a visual indicator representing the merchant that is within the predetermined distance from the location of the automobile, the merchant having the product or service from the shopping list;
   receiving, by the remote computer system from the automobile, a selection of a payment method from the plurality of payment methods corresponding to the profile associated with the wallet credential, and an indication of the product or service.

2. The computer-implemented method of claim 1, wherein determining, by the remote computer system, the merchant within the predetermined distance from the location of the automobile having the product or service from the shopping list includes receiving, by the remote computer system, a store inventory request for the merchant.

3. The computer-implemented method of claim 2, further comprising sending, in response to the store inventory request and by the remote computer system, a store injection response to the automobile, wherein the store injection response identifies the merchant that is within the predetermined distance from the location of the automobile having the product or service.

4. The computer-implemented method of claim 1, wherein the shopping list is associated with and edited by a user corresponding to the wallet application executing at the mobile computing device.

5. The computer-implemented method of claim 1, further comprising receiving, by the remote computer system, one or more settings of the automobile to complete a purchase transaction using the wallet application based on the sent profile.

6. The computer-implemented method of claim 5, wherein the profile includes a payment method profile, and wherein the one or more settings of the automobile include a payment method setting based on the payment method profile.

7. The computer-implemented method of claim 5, further comprising causing, by the remote computer system and in response to the payment transaction request, the automobile to transmit payment device data corresponding to the wallet application to a payment device reader corresponding to the payment transaction request.

8. The computer-implemented method of claim 1, further comprising causing, by the remote computer system, the automobile to display a visual indicator representing the merchant that is within the predetermined distance from the location of the automobile having the product or service.

9. The computer-implemented method of claim 1, further comprising:
   authenticating, by the remote computer system, another wallet credential from another wallet application executing at another mobile computing device;
   sending, by the remote computer system, another profile associated with the other wallet credential to the automobile in response to the authenticating step; and
   configuring, by the automobile, one or more settings of the automobile based on the other profile.

10. A system for personalizing an automobile, comprising:
    a processor; and
    a memory disposed in communication with the processor and storing processor-executable instructions for:
    authenticating, by a remote computer system, a wallet credential from a wallet application executing at a mobile computing device;
    sending, by the remote computer system, a profile associated with the wallet credential to the automobile in response to the authenticating step, the profile including a shopping list corresponding to the wallet application, the shopping list associated with and edited by a user of the mobile computing device and including at least one entry specifying a product or service;
    determining, by the remote computer system, a merchant within a predetermined distance from a location of the automobile, the merchant having the product or service from the shopping list in response to a store inventory request from the automobile;
    receiving, by the remote computer system, a payment transaction request for the product or service from the automobile via the wallet application;
    sending, by the remote computer system and in response to the store inventory request and the payment transaction request:
       a plurality of payment methods to the automobile, the plurality of payment methods corresponding to the profile associated with the wallet credential,
       a store injection response that identifies the merchant within the predetermined distance from the location of the automobile, the merchant having the product or service from the shopping list,
       map data indicating a route from the location of the automobile to the merchant within the predetermined distance from the location of the automobile having the product or service from the shopping list, and computer-executable instructions to generate a visual map and navigation instructions at the automobile using the map data and a visual indicator representing the merchant that is within the predetermined distance from the location of the automobile, the merchant having the product or service from the shopping list;

receiving, by the remote computer system from the automobile, a selection of a payment method from the plurality of payment methods corresponding to the profile associated with the wallet credential, and an indication of the product or service.

11. The system of claim 10, wherein the instructions for determining, by the remote computer system, the merchant within the predetermined distance from the location of the automobile having the product or service from the shopping list includes instructions for receiving, by the remote computer system, a store inventory request for the merchant.

12. The system of claim 11, further comprising instructions for sending, in response to the store inventory request and by the remote computer system, a store injection response to the automobile, wherein the store injection response identifies the merchant that is within the predetermined distance from the location of the automobile having the product or service.

13. The system of claim 10, wherein the shopping list is associated with and edited by a user corresponding to the wallet application executing at the mobile computing device.

14. The system of claim 10, further comprising instructions for receiving, by the remote computer system, one or more settings of the automobile to complete a purchase transaction using the wallet application based on the sent profile.

15. The system of claim 14, wherein the profile includes a payment method profile, and wherein the one or more settings of the automobile include a payment method setting based on the payment method profile.

16. The system of claim 14, further comprising instructions for causing, by the remote computer system and in response to the payment transaction request, the automobile to transmit payment device data corresponding to the wallet application to a payment device reader corresponding to the payment transaction request.

17. The system of claim 10, further comprising instructions for causing, by the remote computer system, the automobile to display a visual indicator representing the merchant that is within the predetermined distance from the location of the automobile having the product or service.

18. The system of claim 10, further comprising instructions for:

authenticating, by the remote computer system, another wallet credential from another wallet application executing at another mobile computing device;

sending, by the remote computer system, another profile associated with the other wallet credential to the automobile in response to the authenticating step; and configuring, by the automobile, one or more settings of the automobile based on the other profile.

* * * * *